US010518661B2

(12) United States Patent
Haneda

(10) Patent No.: US 10,518,661 B2
(45) Date of Patent: Dec. 31, 2019

(54) INFORMATION PROCESSING SYSTEM, INFORMATION PROCESSING METHOD, AND NON-TRANSITORY COMPUTER READABLE MEDIUM STORING PROGRAM

(71) Applicant: HONDA MOTOR CO., LTD., Tokyo (JP)

(72) Inventor: Satoshi Haneda, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/260,126

(22) Filed: Jan. 29, 2019

(65) Prior Publication Data
US 2019/0152340 A1 May 23, 2019

Related U.S. Application Data

(63) Continuation of application No. PCT/JP2017/027577, filed on Jul. 28, 2017.

(30) Foreign Application Priority Data

Jul. 29, 2016 (JP) .................................. 2016-150633

(51) Int. Cl.
| | |
|---|---|
| *B60L 53/62* | (2019.01) |
| *B60L 53/66* | (2019.01) |
| *B60L 58/12* | (2019.01) |
| *G01C 21/34* | (2006.01) |

(52) U.S. Cl.
CPC ............. *B60L 53/62* (2019.02); *B60L 53/665* (2019.02); *B60L 58/12* (2019.02); *G01C 21/3407* (2013.01); *G01C 21/3469* (2013.01)

(58) Field of Classification Search
None
See application file for complete search history.

(56) References Cited

U.S. PATENT DOCUMENTS

| | | |
|---|---|---|
| 2012/0005125 A1 | 1/2012 | Jammer |
| 2012/0109409 A1 | 5/2012 | Hara |
| (Continued) | | |

FOREIGN PATENT DOCUMENTS

| | | |
|---|---|---|
| EP | 2447107 A2 | 5/2012 |
| EP | 2894436 A1 | 7/2015 |
| (Continued) | | |

OTHER PUBLICATIONS

International Search Report and Written Opinion for International Patent Application No. PCT/JP2017/027577, issued by the Japan Patent Office dated Dec. 6, 2017.

(Continued)

*Primary Examiner* — Richard M Camby

(57) ABSTRACT

A request amount acquiring unit, a supply speed acquiring unit, and a supply time period determining unit are provided. The request amount acquiring unit acquires information related to a request amount of a consumable, the request amount determined based on a location of a device which uses the consumable, the supply speed acquiring unit acquires information related to the supply speed of a supply candidate which can supply the request amount of the consumable based on (i) information related to a suppliable amount of the consumable and (ii) information related to a supply speed of the consumable of each of one or more supply candidates which can supply the consumable, and the supply time period determining unit determines a supply time period based on the request amount and the information related to the supply speed of each of the supply candidates which can supply the request amount of the consumable.

31 Claims, 20 Drawing Sheets

(56) References Cited

U.S. PATENT DOCUMENTS

| | | | |
|---|---|---|---|
| 2012/0109519 A1 | 5/2012 | Uyeki | |
| 2012/0136743 A1* | 5/2012 | McQuade | G06Q 30/0611 |
| | | | 705/26.3 |
| 2012/0306446 A1 | 12/2012 | Suganuma | |
| 2013/0204471 A1 | 8/2013 | O'Connell | |
| 2014/0371969 A1 | 12/2014 | Asai | |
| 2015/0158393 A1 | 6/2015 | Kawano | |
| 2015/0191095 A1 | 7/2015 | Jones | |
| 2015/0286965 A1 | 10/2015 | Amano | |
| 2015/0298565 A1 | 10/2015 | Iwamura | |
| 2016/0019497 A1* | 1/2016 | Carvajal | G06Q 10/08 |
| | | | 701/519 |
| 2017/0088114 A1 | 3/2017 | Nawata | |
| 2017/0349039 A1* | 12/2017 | Rayner | B60L 53/68 |

FOREIGN PATENT DOCUMENTS

| | | |
|---|---|---|
| JP | 2010035333 A | 2/2010 |
| JP | 2011227541 A | 11/2011 |
| JP | 2012217224 A | 11/2012 |
| JP | 2012220289 A | 11/2012 |
| JP | 2012244785 A | 12/2012 |
| JP | 2013162710 A | 8/2013 |
| JP | 2015174629 A | 10/2015 |
| WO | 2011102515 A1 | 8/2011 |
| WO | 2012058022 A2 | 5/2012 |
| WO | 2014027690 A1 | 2/2014 |
| WO | 2015063967 A1 | 5/2015 |

OTHER PUBLICATIONS

Office Action issued for counterpart Japanese Application 2016-150633, drafted by the Japan Patent Office dated May 19, 2017.
Office Action issued for counterpart Taiwanese Application 106125469, issued by the Taiwan Intellectual Property Office dated Nov. 5, 2018.
Office Action issued for counterpart Japanese Application 2016-150633, drafted by the Japan Patent Office dated Sep. 12, 2017.

* cited by examiner

| 702 | 704 | 706 | 708 | 710 | 712 | 714 |
|---|---|---|---|---|---|---|
| DEMANDER ID | ADDRESS | CURRENT LOCATION | OUTSIDE ATMOSPHERIC TEMPERATURE | BATTERY RESIDUAL AMOUNT | DEVICE CHARACTERICS | PERSONAL INFORMATION |
| D0001 | *** | (*,*,*) | **°C | **kWh | *** | *** |
| D0002 | *** | (*,*,*) | **°C | **kWh | *** | *** |
| D0003 | *** | (*,*,*) | **°C | **kWh | *** | *** |
| D0004 | *** | (*,*,*) | **°C | **kWh | *** | *** |
| D0005 | *** | (*,*,*) | **°C | **kWh | *** | *** |
| D0006 | *** | (*,*,*) | **°C | **kWh | *** | *** |
| .. | .. | .. | .. | .. | .. | .. |

| 800 | | |
|---|---|---|
| REQUEST ID (802) | DEMANDER ID (804) | REQUEST CONTENTS (806) |
| R0001 | *** | *, *, *, *, *, *, *, *, *, ... |
| R0002 | *** | *, *, *, *, *, *, *, *, *, ... |
| R0003 | *** | *, *, *, *, *, *, *, *, *, ... |
| R0004 | *** | *, *, *, *, *, *, *, *, *, ... |
| R0005 | *** | *, *, *, *, *, *, *, *, *, ... |
| R0006 | *** | *, *, *, *, *, *, *, *, *, ... |
| .. | .. | .. |

FIG. 11

| 902 | 904 | 906 | 908 | 910 | 912 | 914 |
|---|---|---|---|---|---|---|
| SUPPLY CANDIDATE ID | ADDRESS | CURRENT LOCATION | BASIC CONDITION | CONDITION NEGOTIATION | STATUS | PERSONAL INFORMATION |
| S0001 | *** | (*,*,*) | *,*,*,... | POSSIBLE | IMPOSSIBLE TO BID | *** |
| S0002 | *** | (*,*,*) | *,*,*,... | POSSIBLE | POSSIBLE TO BID | *** |
| S0003 | *** | (*,*,*) | *,*,*,... | IMPOSSIBLE | POSSIBLE TO BID | *** |
| S0004 | *** | (*,*,*) | *,*,*,... | IMPOSSIBLE | IMPOSSIBLE TO BID | *** |
| S0005 | *** | (*,*,*) | *,*,*,... | IMPOSSIBLE | POSSIBLE TO BID | *** |
| S0006 | *** | (*,*,*) | *,*,*,... | POSSIBLE | POSSIBLE TO BID | *** |
| .. | .. | .. | .. | .. | .. | .. |

INFORMATION PROCESSING SYSTEM, INFORMATION PROCESSING METHOD, AND NON-TRANSITORY COMPUTER READABLE MEDIUM STORING PROGRAM

CROSS REFERENCE TO RELATED APPLICATION

This is a continuation application of International Application No. PCT/JP2017/027577, filed on Jul. 28, 2017, which claims priority to Japanese Patent Application No. 2016-150633, filed on Jul. 29, 2016, the contents of each of which are incorporated herein by reference.

TECHNICAL FIELD

The present invention relates to an information processing system, an information processing method, and a program.

RELATED ART

A system of supporting electric automobile charging has been known (for example, refer to Patent Documents 1 to 3).
Patent Document 1: Japanese Patent Application Publication No. 2010-035333
Patent Document 2: Japanese Patent Application Publication No. 2012-244785
Patent Document 3: Japanese Patent Application Publication No. 2012-217224

SUMMARY

In a case where a consumable is supplied from a device on a supply side to a device on a demand side, a supply speed of the consumable may be different depending on specifications, states, and the like of the device on the demand side and of the device on the supply side. Also, there is a possibility that a request amount of the consumable varies according to a peripheral environment of the device on the demand side, such as a location of a supply facility of the consumable and a number of suppliers of the consumable existing in the neighborhood.

In a first aspect of the present invention, an information processing system is provided. The above-described information processing system may include a request amount acquiring unit to acquire information related to a request amount of a consumable, the request amount determined based on a location of a device which uses the consumable. The above-described information processing system may include a supply speed acquiring unit to acquire information related to a supply speed of a supply candidate which can supply the request amount of the consumable based on (i) information related to a suppliable amount of the consumable and (ii) information related to the supply speed of the consumable of each of one or more supply candidates which can supply the consumable. The above-described information processing system may include a supply time period determining unit to determine a supply time period, which is a period from a time at which the supply candidate starts to provide the consumable to a time at which the request amount of the consumable is provided, based on the request amount acquired by the request amount acquiring unit and the information related to the supply speed acquired by the supply speed acquiring unit with respect to each of the supply candidates which can supply the request amount of the consumable. In the above-described information processing system, the device may be a mobile body. In the above-described information processing system, the consumable may be energy or an energy source for driving the mobile body.

The above-described information processing system may include a supplier determining unit to determine a supplier or a supply apparatus of the consumable based on the supply time period determined by the supply time period determining unit. The above-described information processing system may include a selection screen generating unit to generate a selection screen showing candidate identification information for identifying each supply candidate and the supply time period determined by the supply time period determining unit which are corresponded to each other with respect to each of the supply candidates which can supply the request amount of the consumable. The above-described information processing system may include an output controlling unit to cause an output unit of the device or of a communication terminal of a user of the device to output a selection screen generated by the selection screen generating unit. The above-described information processing system may include a user instruction acquiring unit to acquire candidate identification information of the supply candidate selected by the user as the supplier or the supply apparatus from the device or the communication terminal of the user of the device. In the above-described information processing system, the supplier determining unit may determine, as the supplier or the supply apparatus, a supply candidate which is identified according to the candidate identification information acquired by the user instruction acquiring unit.

The above-described information processing system may include a completion time period determining unit to determine a completion time period which is a period from a time at which a transaction is established to a time at which the request amount of the consumable is provided based on (i) a period from a time at which the transaction is established to a time at which a provision of the consumable is started and (ii) the supply time period determined by the supply time period determining unit with respect to each of the supply candidates which can supply the request amount of the consumable. The above-described information processing system may include a supplier determining unit to determine the supplier or the supply apparatus of the consumable based on the completion time period determined by the completion time period determining unit. The above-described information processing system may include a selection screen generating unit to generate a selection screen showing candidate identification information for identifying each supply candidate and the completion time period determined by the completion time period determining unit which are corresponded to each other with respect to each of the supply candidates which can supply the request amount of the consumable. The above-described information processing system may include an output controlling unit to cause an output unit of the device or of a communication terminal of a user of the device to output the selection screen generated by the selection screen generating unit. The above-described information processing system may include a user instruction acquiring unit to acquire the candidate identification information of the supply candidate selected by the user as the supplier or the supply apparatus from the device or the communication terminal of the user of the device. In the above-described information processing system, the supplier determining unit may determine a supply candidate identified according to the candidate identification information acquired by the user instruction acquiring unit as the supplier or the supply apparatus.

In a second aspect of the present invention, an information processing system is provided. The above-described information processing system may include a request amount acquiring unit to acquire information related to a request amount of a consumable, the request amount determined based on a location of a device which uses the consumable. The above-described information processing system may include a supply speed acquiring unit to acquire information related to a supply speed of a supply candidate which can supply the request amount of the consumable based on (i) information related to a suppliable amount of the consumable and (ii) information related to the supply speed of the consumable of each of one or more supply candidates which can supply the consumable. The above-described information processing system may include a completion time determining unit to determine a completion time which is a time at which a provision of the request amount of the consumable is completed based on the request amount acquired by the request amount acquiring unit and the information related to the supply speed acquired by the supply speed acquiring unit with respect to each of the supply candidates which can supply the request amount of the consumable. In the above-described information processing system, the device may be a mobile body. In the above-described information processing system, the consumable may be energy or an energy source for driving the mobile body.

The above-described information processing system may include a supplier determining unit to determine the supplier or the supply apparatus of the consumable based on the completion time determined by the completion time determining unit. The above-described information processing system may include a selection screen generating unit to generate a selection screen showing candidate identification information for identifying each supply candidate and the completion time determined by the completion time determining unit which are corresponded to each other with respect to each of the supply candidates which can supply the request amount of the consumable. The above-described information processing system may include an output controlling unit to cause an output unit of the device or of a communication terminal of a user of the device to output the selection screen generated by the selection screen generating unit. The above-described information processing system may include a user instruction acquiring unit to acquire the candidate identification information of the supply candidate selected by the user as the supplier or the supply apparatus from the device or the communication terminal of the user of the device. In the above-described information processing system, the supplier determining unit may determine a supply candidate identified according to the candidate identification information acquired by the user instruction acquiring unit as the supplier or the supply apparatus.

In the above-described first aspect and second aspect, the above-described information processing system may include a residual amount acquiring unit to acquire information related to a residual amount of the consumable. The above-described information processing system may include a detecting unit to detect whether the residual amount acquired by the residual amount acquiring unit is smaller than a predetermined value. In the above-described information processing system, if the detecting unit detects that the residual amount is smaller than the predetermined value, the supplier determining unit may determine the supplier or the supply apparatus from the supply candidates by which a period until a provision of the consumable is started is shorter than a predetermined period among the supply candidates which can supply the request amount of the consumable. The above-described information processing system may include an atmospheric temperature acquiring unit to acquire information related to an atmospheric temperature in the periphery of the device. In the above-described information processing system, the predetermined value may be set based on the atmospheric temperature acquired by the atmospheric temperature acquiring unit.

In the above-described first aspect and second aspect, the above-described information processing system may include a request amount determining unit to determine the request amount based on a location of the device. The above-described information processing system may include a device location acquiring unit to acquire device location information related to the location of the device in a specified time period. The above-described information processing system may include a residual amount acquiring unit to acquire information related to a residual amount of the consumable in a specified time period. In the above-described information processing system, the request amount determining unit may determine the request amount based on the device location information acquired by the device location acquiring unit and the information related to the residual amount acquired by the residual amount acquiring unit.

According to the above-described first aspect and second aspect, in the above-described information processing system, the device may be an electric automobile. In the above-described information processing system, the consumable may be electric power. The above-described information processing system may include a map screen generation unit to generate, based on a supply location information related to a location of each of one or more supply candidates, a map screen on which one or more icons showing a location of each of at least part of the supply candidates are displayed on a map. In the above-described information processing system, the screen generating unit may determine at least one of a shape, a pattern, a color, and a size of the one or more icons based on a supply speed of the at least part of the supply candidates, the at least part corresponding to the one or more icons.

In a third aspect of the present invention, an information processing system is provided. The above-described information processing system may include a map screen generation unit to generate, based on (i) supply location information related to a location and (ii) information related to a supply speed of the consumable of each of one or more supply candidates which can supply the consumable, a map screen on which one or more icons showing a location of each of at least part of the supply candidates are displayed on a map. The above-described information processing system may include a supply speed acquiring unit to acquire information related to a supply speed of at least part of the supply candidates. In the above-described information processing system, the screen generating unit may determine at least one of a shape, a pattern, a color, and a size of the one or more icons based on information related to a supply speed of the at least part of the supply candidates, the at least part corresponding to the one or more icons. In the above-described information processing system, the screen generating unit may generate a map screen on which information showing at least one of (i) a suppliable time period, (ii) a suppliable area, (iii) a suppliable amount, (iv) a standard or quality, and (v) a price of the consumable is further displayed.

In a fourth aspect of the present invention, an information processing system is provided. The above-described information processing system may include a request amount acquiring unit to acquire information related to a request amount of a consumable, the request amount determined based on a location of a device which uses the consumable. The above-described information processing system may include a supply speed acquiring unit to acquire information related to a supply speed of a supply candidate which can supply the request amount of the consumable based on (i) information related to a suppliable amount of the consumable and (ii) information related to the supply speed of the consumable of each of one or more supply candidates which can supply the consumable. The above-described information processing system may include a supply time period determining unit to determine a supply time period, which is a period from a time at which the supply candidate starts to provide the consumable to a time at which the request amount of the consumable is provided, based on the request amount acquired by the request amount acquiring unit and the information related to the supply speed acquired by the supply speed acquiring unit with respect to each of the supply candidates which can supply the request amount of the consumable.

In a fifth aspect of the present invention, provided is a non-transitory computer readable medium storing thereon a program causing a computer to serve as the information processing system described above.

In a sixth aspect of the present invention, an information processing method is provided. The above-described information processing method may include a request amount acquiring step of acquiring information related to a request amount of a consumable, the request amount determined based on a location of a device which uses the consumable. The above-described information processing method may include a supply speed acquiring step of acquiring information related to a supply speed of a supply candidate which can supply the request amount of the consumable based on (i) information related to a suppliable amount of the consumable and (ii) information related to the supply speed of the consumable of each of one or more supply candidates which can supply the consumable. The above-described information processing method may include a supply time period determining step of determining a supply time period, which is a period from a time at which the supply candidate starts to provide the consumable to a time at which the request amount of the consumable is provided, based on the request amount acquired in the request amount acquiring step and the information related to the supply speed acquired in the supply speed acquiring step with respect to each of the supply candidates which can supply the request amount of the consumable. In the above-described information processing method the device may be a mobile body. In the above-described information processing method, the consumable may be energy or an energy source for driving the mobile body.

In a seventh aspect of the present invention, the information processing method is provided. The above-described information processing method may include a request amount acquiring step of acquiring information related to a request amount of a consumable, the request amount determined based on a location of a device which uses the consumable. The above-described information processing method may include a supply speed acquiring step of acquiring information related to a supply speed of a supply candidate which can supply the request amount of the consumable based on (i) information related to a suppliable amount of the consumable and (ii) information related to the supply speed of the consumable of each of one or more supply candidates which can supply the consumable. The above-described information processing method may include a completion time determining step of determining a completion time which is a time at which a provision of the request amount of the consumable is completed based on the request amount acquired in the request amount acquiring step and the information related to the supply speed acquired in the supply speed acquiring step with respect to each of the supply candidates which can supply the request amount of the consumable. In the above-described information processing method, the device may be a mobile body. In the above-described information processing method, the consumable may be energy or energy source for driving the mobile body.

In the eighth aspect of the present invention, an information processing method is provided. The above-described information processing method may include a request amount acquiring step of acquiring information related to a request amount of a consumable, the request amount determined based on a location of a device which uses the consumable. The above-described information processing method may include a supply speed acquiring step of acquiring information related to a supply speed of a supply candidate which can supply the request amount of the consumable based on (i) information related to a suppliable amount of the consumable and (ii) information related to the supply speed of the consumable of each of one or more supply candidates which can supply the consumable. The above-described information processing method may include a supply time period determining step of determining a supply time period, which is a period from a time at which the supply candidate starts to provide the consumable to a time at which the request amount of the consumable is provided, based on the request amount acquired in the request amount acquiring step and the information related to the supply speed acquired in the supply speed acquiring step with respect to each of the supply candidates which can supply the request amount of the consumable.

In a ninth aspect of the present invention, an information processing method is provided. The above-described information processing method may include a map screen generating step of generating, based on (i) supply location information related to a location and (ii) information related to a supply speed of the consumable of each of one or more supply candidates which can supply the consumable, a map screen on which one or more icons showing a location of each of at least part of the supply candidates are displayed on a map. The above-described information processing method may include a supply speed acquiring step of acquiring information related to a supply speed of at least part of the supply candidates. In the above-described information processing method, the screen generating step may include a step of determining at least one of a shape, a pattern, a color, and a size of the one or more icons based on information related to a supply speed of the at least part of the supply candidates, the at least part corresponding to the one or more icons.

The summary clause does not necessarily describe all necessary features of the embodiments of the present invention. Also, the present invention may also be a sub-combination of the features described above.

BRIEF DESCRIPTION OF DRAWINGS

FIG. 10 schematically shows one example of a data table 700.

FIG. 11 schematically shows one example of a data table 800.

FIG. 12 schematically shows one example of a data table 900.

DESCRIPTION OF EXEMPLARY EMBODIMENTS

Figure 1:
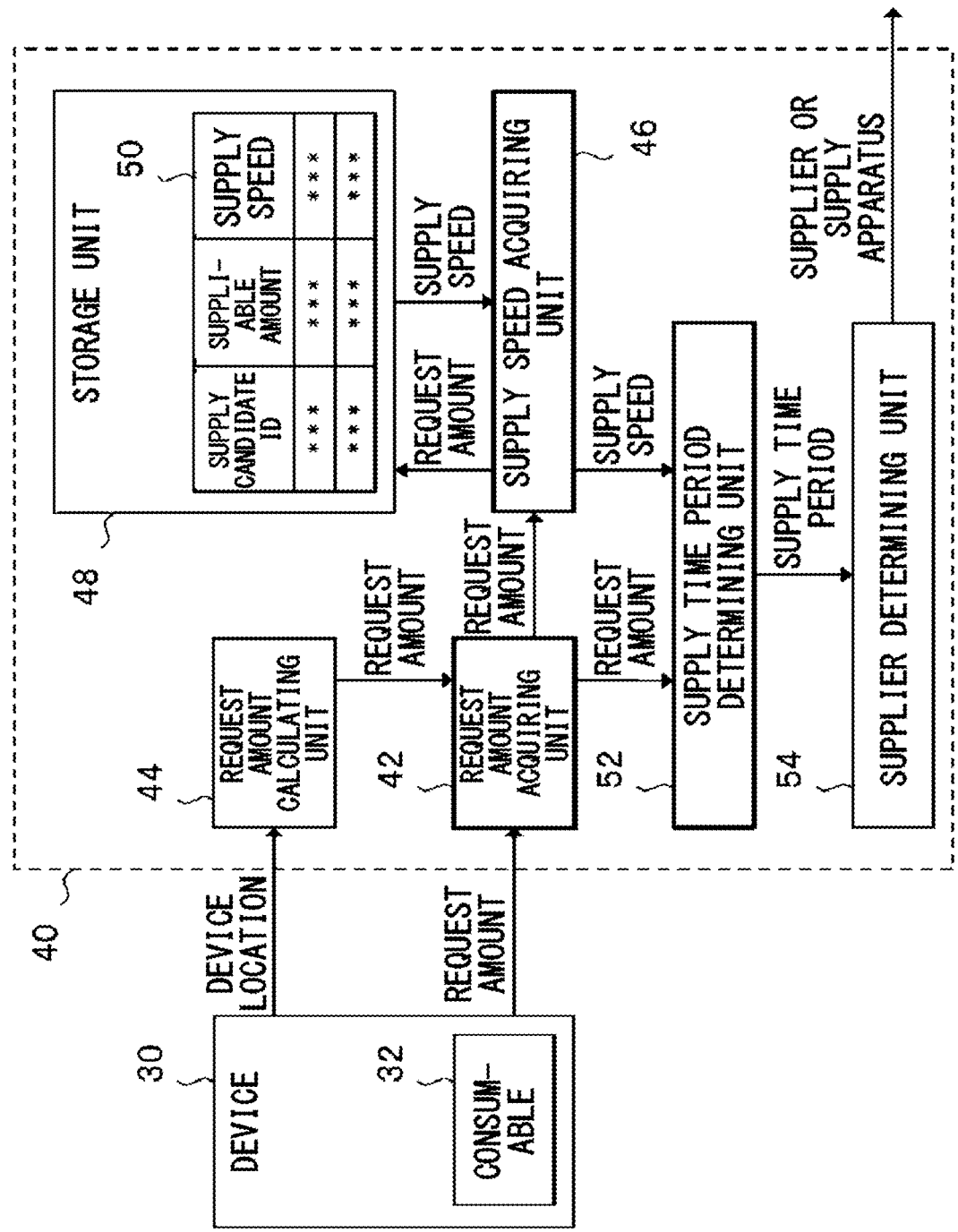
FIG. 1 schematically shows one example of a system configuration of an information processing apparatus 40.

Hereinafter, some embodiments of the present invention will be described. The embodiments do not limit the invention according to the claims, and all the combinations of the features described in the embodiments are not necessarily essential to means provided by aspects of the invention. Note that in the drawings, the same reference numerals may be assigned to the same or similar portions, and redundant descriptions may be omitted.

FIG. 1 schematically shows one example of a system configuration of an information processing apparatus 40. The information processing apparatus 40 may be one example of an information processing system. The information processing apparatus 40 matches a demander and a supplier of a consumable 32, for example. In the present embodiment, the information processing apparatus 40 determines a supplier or a supply apparatus which supplies the consumable 32 to a device 30.

The device 30 may be a machine, an instrument, or an appliance which uses the consumable 32, and the detail is not particularly limited. The device 30 may have at least one of an internal combustion engine, a battery and a power generating apparatus. As the power generating apparatus, (i) an alternator which generates power by using an internal combustion engine, (ii) a fuel cell, (iii) a natural energy power generating system, such as a solar power generating apparatus, and the like may be exemplified. The device 30 may be a mobile body. For example, the mobile body moves by using the consumable 32. The mobile body may have an automatic operation function (which may be referred to as an auto-cruise, cruise control, and the like) by a mounted computer.

As the mobile body, an automobile, a two-wheeled motor vehicle, a marine vessel, a flight vehicle, and the like may be exemplified. As the automobile, an engine vehicle, an electric automobile, a fuel cell vehicle, a hybrid vehicle, a movable working machine, and the like may be exemplified. A movement manner of the working machine may be an automatic manner or may be a manual manner. As the working machine, a lawn mower, a grass mower, a tiller, a tractor, a conveying machine, a pump, a sprayer, a cleaning machine, a snow plow, and the like may be exemplified.

As the two-wheeled motor vehicle, (i) a motorcycle, (ii) a three-wheeled motorcycle, (iii) a stand-riding type two-wheeled vehicle with a power unit, such as Segway, Kickboard with a power unit and a skateboard with a power unit, and the like may be exemplified. The power unit may be (i) an internal combustion engine such as an engine, a motor, and the like, or may be (ii) a combination of a power storage apparatus or power generating apparatus and an electric motor. As the marine vessel, a ship, a hovercraft, a water bike, a submarine, a submarine vessel, an underwater scooter, and the like may be exemplified. As the flight vehicle, an airplane, an airship or a balloon, an air balloon, a helicopter, a drone, and the like may be exemplified.

The consumable 32 may be anything used by the device 30, and the detail is not particularly limited. It is preferable that the consumable 32 is a thing to be used, consumed, or discharged together with the movement of the device 30. The consumable 32 is not limited to a tangible thing. The consumable 32 may be energy. The energy may be electric power or electricity (simply referred to as electric power in some cases). In one embodiment, the consumable 32 may be energy or an energy source for driving the device 30. The consumable 32 may be energy or an energy source for driving and moving the device 30.

As the supply method of the consumable, supplement, replacement, and the like may be exemplified. In one embodiment, in a case where the consumable is electric power or electricity, the supply method of the consumable may be battery charging. In another embodiment, in a case where the consumable is a battery itself, the supply method of the consumable may be battery replacement.

[System Configuration of Information Processing Apparatus 40]

In the present embodiment, the information processing apparatus 40 includes a request amount acquiring unit 42, a supply speed acquiring unit 46, and a supply time period determining unit 52. The information processing apparatus 40 may further include at least one of a request amount calculating unit 44, a storage unit 48, and a supplier determining unit 54. The storage unit 48 may store a data table 50. In the present embodiment, the data table 50 makes identification information of each supply candidate, information related to an amount or a quantity (referred to as a suppliable amount in some cases) of the consumable 32 suppliable by each supply candidate, and information related to a supply speed of the consumable 32 of each supply candidate be corresponded to each other, and stores them. As the information related to the supply speed, (i) a rated value or an actual value of the supply speed, (ii) identification information of a supply apparatus, such as a manufacturer, a model, and a serial number of the supply apparatus, and the like may be exemplified.

In the present embodiment, the request amount acquiring unit 42 acquires information related to a request amount of the consumable 32 in the device 30. The request amount of the consumable 32 may be determined based on a location of the device 30. In the present embodiment, the request amount acquiring unit 42 sends the information related to the request amount of the consumable 32 to the supply speed acquiring unit 46. Also, the request amount acquiring unit 42 sends the information related to the request amount of the consumable 32 to the supply time period determining unit 52.

In one embodiment, the request amount acquiring unit 42 acquires the request amount of the consumable 32 by receiving the information showing the request amount of the consumable 32 from the device 30. In another embodiment, the request amount acquiring unit 42 acquires the request amount of the consumable 32 by receiving the information showing the request amount of the consumable 32 from the request amount calculating unit 44, the request amount calculated by the request amount calculating unit 44. Furthermore, in another embodiment, the request amount acquiring unit 42 receives information for calculating the request amount of the consumable 32 from the device 30 or another device (not illustrated). The request amount acquiring unit 42 acquires the request amount of the consumable 32 by calculating the request amount of the consumable 32 based on the information received from the device 30. The request amount acquiring unit 42 may calculate the request amount of the consumable 32 by a method similar to that of the request amount calculating unit 44 which will be described later.

In the present embodiment, the request amount calculating unit 44 receives the information for calculating the request amount of the consumable 32 from the device 30 or another device (not illustrated). The request amount calculating unit 44 determines the request amount of the consumable 32 in the device 30 based on the information received from the device 30 and the like. The request amount calculating unit 44 may determine the request amount of the consumable 32 based on a location of the device 30. The request amount calculating unit 44 sends the information showing the request amount of the consumable 32 to the request amount acquiring unit 42.

For example, the request amount calculating unit 44 acquires the information related to the location of the device 30 from the device 30 or another device. The information related to the location of the device 30 may be location information of a current location of the device 30, or may be location information of a merging area with a supplier or a supply apparatus. The information related to the location of the device 30 may be one example of the information for calculating the request amount of the consumable 32. The request amount calculating unit 44 determines the request amount of the consumable 32 based on the information related to the location of the device 30.

According to one embodiment, the request amount calculating unit 44 accesses to a storage apparatus (not illustrated) to acquire location information of a fixed type supply facility which can supply the consumable 32. As the fixed type supply facility, a gasoline stand, a charging station, and the like may be exemplified. The above-described storage apparatus may be arranged within the information processing apparatus 40 or may be arranged in the outside of the information processing apparatus 40. The request amount calculating unit 44 calculates an amount of the consumable 32 which is to be consumed in a case where the device 30 moves from the current location or the merging area to the fixed type supply facility, as the request amount of the consumable 32.

The request amount calculating unit 44 calculates the request amount of the consumable 32 based on, for example, (i) path information from the current location or the merging area to the fixed type supply facility (the path information may include information related to a difference in height) and (ii) a consumption amount of the consumable 32 per unit distance in the device 30 (the consumption amount per unit distance may be a rated value or may be an actual value). More Specifically, the request amount of the consumable 32 is calculated by dividing a movement distance to the closest supply facility by the consumption amount per unit distance. The request amount calculating unit 44 may determine the request amount of the consumable 32 also with reference to a data table on which a rough estimate value of the consumption amount of the consumable 32 between any two points is stored.

The request amount calculating unit 44 may further acquire information related to a residual amount of the consumable 32 from the device 30 or another device. As the information related to the residual amount of the consumable 32, the residual amount of the consumable 32 in the current location, an estimate residual amount of the consumable 32 in the merging area, and the like may be exemplified. The request amount calculating unit 44 may also consider the information related to the residual amount of the consumable 32 to determine the request amount of the consumable 32. More specifically, the request amount of the consumable 32 is calculated by subtracting the residual amount of the consumable 32 from the amount of the consumable 32 which is consumed when the device 30 moves to the closest supply facility. The information related to the residual amount of the consumable 32 may be one example of the information for calculating the request amount of the consumable 32.

According to another embodiment, the request amount calculating unit 44 acquires the information related to a movement path of the device 30 from the device 30 or another device. As the information related to the movement path, location information related to a relay point or a destination may be exemplified. According to a procedure similar to the above-described embodiment, the request amount calculating unit 44 calculates the amount of the consumable 32 which is consumed when the device 30 moves from the current location or the merging area to the relay point or the destination, as the request amount of the consumable 32. The request amount calculating unit 44 may also consider the information related to the residual amount of the consumable 32 to determine the request amount of the consumable 32.

As another example of the information for calculating the request amount of the consumable 32, information related to types of the device 30 may be exemplified. As the information related to the types of the device 30, (i) information related to a common name or a popular name of the device 30 or a proper name of the device 30, (ii) information related to a manufacturer, a model, a serial number, rated values of various characteristics, actual values of various characteristics and the like of the device 30, (iii) information related to a manufacturer, a model, a serial number and the like of a product incorporating the device 30, and the like may be exemplified. In this case, for example, the request amount calculating unit 44 acquires information showing the model. Accordingly, the request amount calculating unit 44 may access to an external storage apparatus (not illustrated) and take the model of the device 30 as the key to acquire the information showing the consumption amount per unit distance of the device 30.

In the present embodiment, the supply speed acquiring unit 46 receives the information showing the request amount of the consumable 32 from the request amount acquiring unit 42, for example. The supply speed acquiring unit 46 acquires the information related to the supply speed of a supply candidate which can supply the request amount of the consumable. The supply speed acquiring unit 46 acquires the above-described information based on, for example, at least one of (i) information related to a suppliable amount of the consumable of each of one or more supply candidates which can supply the consumable and (ii) information related to the supply speed of the consumable of each of the above-described one or more supply candidates. The supply speed acquiring unit 46 sends the acquired information to the supply time period determining unit 52.

According to one embodiment, the supply speed acquiring unit 46 accesses to the storage unit 48 and refers to the data table 50 to acquire the information related to the supply speed of a supply candidate which can supply the request amount of the consumable. More specifically, the supply speed acquiring unit 46 acquires the information related to the supply speed of the supply candidate which can supply the request amount of the consumable according to a procedure described below, for example.

As described above, the data table 50 makes the identification information, the information related to the suppliable amount of the consumable 32, and the information related to the supply speed of the consumable 32 with respect to each of the one or more supply candidates which can supply the consumable be corresponded to each other, and stores them. The supply speed acquiring unit 46 first refers to the data table 50 and extracts identification information of a supply candidate which matches a condition that "the suppliable amount of the consumable 32 according to the supply candidate is equal to or more than the request amount of the consumable 32 in the device 30" from among the one or more supply candidates. An expected amount at a time of merging with the device 30 may be a substitute for the above-described suppliable amount of the consumable 32 according to each supply candidate. The supply speed acquiring unit 46 refers to the data table 50 to acquire the information related to the supply speed of the consumable 32 which is corresponded to the extracted identification information.

Note that the supply speed acquiring unit 46 may further narrow the "supply candidates which can supply the request amount of the consumable" by a condition other than the suppliable amount of the consumable 32. As the condition other than the suppliable amount of the consumable 32, the condition may be a condition that "the location of the supply candidate satisfies a specified condition". As the specified condition, a condition such as "a distance between the location of the supply candidate and the current location of the device 30 or the merging area of the device 30 is smaller than a predetermined value", "the location of the supply candidate is a location in which the supply candidate can merge with the device 30 before a predetermined time", and "the location of the supply candidate is a location in which the supply candidate can merge with the device 30 within the predetermined time period" may be exemplified. The location of the supply candidate may be the current location of the supply candidate, or may be an expected location of the supply candidate at a specified future time.

In the present embodiment, the supply time period determining unit 52 receives information related to the request amount of the consumable 32 in the device 30 from the request amount acquiring unit 42, for example. The supply time period determining unit 52 receives the information related to the supply speed of the supply candidate which can supply the request amount of the consumable from the supply speed acquiring unit 46, for example.

In the present embodiment, the supply time period determining unit 52 determines a supply time period of the consumable 32 based on the information related to the request amount acquired by the request amount acquiring unit 42 and the information related to the supply speed acquired by the supply speed acquiring unit 46 with respect to each of the supply candidates which can supply the request amount of the consumable 32. The supply time period of the consumable 32 may be a period from a time at which each supply candidate starts to provide the consumable 32 to a time at which the request amount of the consumable 32 is provided. For example, the supply time period determining unit 52 determines the supply time period of each supply candidate by dividing the request amount of the consumable 32 in the device 30 by the supply speed of the consumable 32 according to each supply candidate. The supply time period determining unit 52 sends the information showing the supply time period of each supply candidate to the supplier determining unit 54.

In the present embodiment, the supplier determining unit 54 receives the information showing the supply time period of each supply candidate from the supply time period determining unit 52. The supplier determining unit 54 determines the supplier or the supply apparatus of the consumable 32 based on the supply time period determined by the supply time period determining unit 52. According to one embodiment, the supplier determining unit 54 determines a supply candidate by which the supply time period satisfies a predetermined condition, as the supplier or the supply apparatus. As the predetermined condition, a condition such as "the supply time period is the shortest", and "the supply time period is the shortest among the supply candidates by which the quality of the consumable 32 satisfies a constant criteria" may be exemplified. According to another embodiment, the supplier determining unit 54 determines the supplier or the supply apparatus in accordance with an instruction of a user of the device 30.

[Specific Configuration of Each Unit of Information Processing Apparatus 40]

Each unit of the information processing apparatus 40 may be realized by hardware, or maybe realized by software, or may be realized by hardware and software. Each unit of the information processing apparatus 40 may be realized by a single server or may be realized by a plurality of servers.

In a case where at least part of components included in the information processing apparatus 40 are realized by software, the components may be realized by starting the software or a program which specifies operations related to the components in an information processing apparatus which is a general configuration. The above-described information processing apparatus may include (i) a data processing apparatus having a processor, such as CPU and GPU, ROM, RAM, a communications interface and the like, (ii) an input apparatus such as a keyboard, a touch panel, a camera, a microphone, various sensors, and a GPS receiver, (iii) an output apparatus such as a display apparatus, a speaker, and a vibration apparatus, and (iv) a storage apparatus (including an external storage apparatus) such as a memory and HDD. At least part of the information processing apparatus 40 may be realized on a virtual server or on a cloud system.

In the above-described information processing apparatus, the above-described data processing apparatus or storage apparatus may store the above-described software or program. By being executed by the processor, the above-described software or program causes the above-described information processing apparatus to execute the operations specified by the software or program. The above-described software or program may have been stored in a non-transitory computer readable recording medium.

Figure 2:
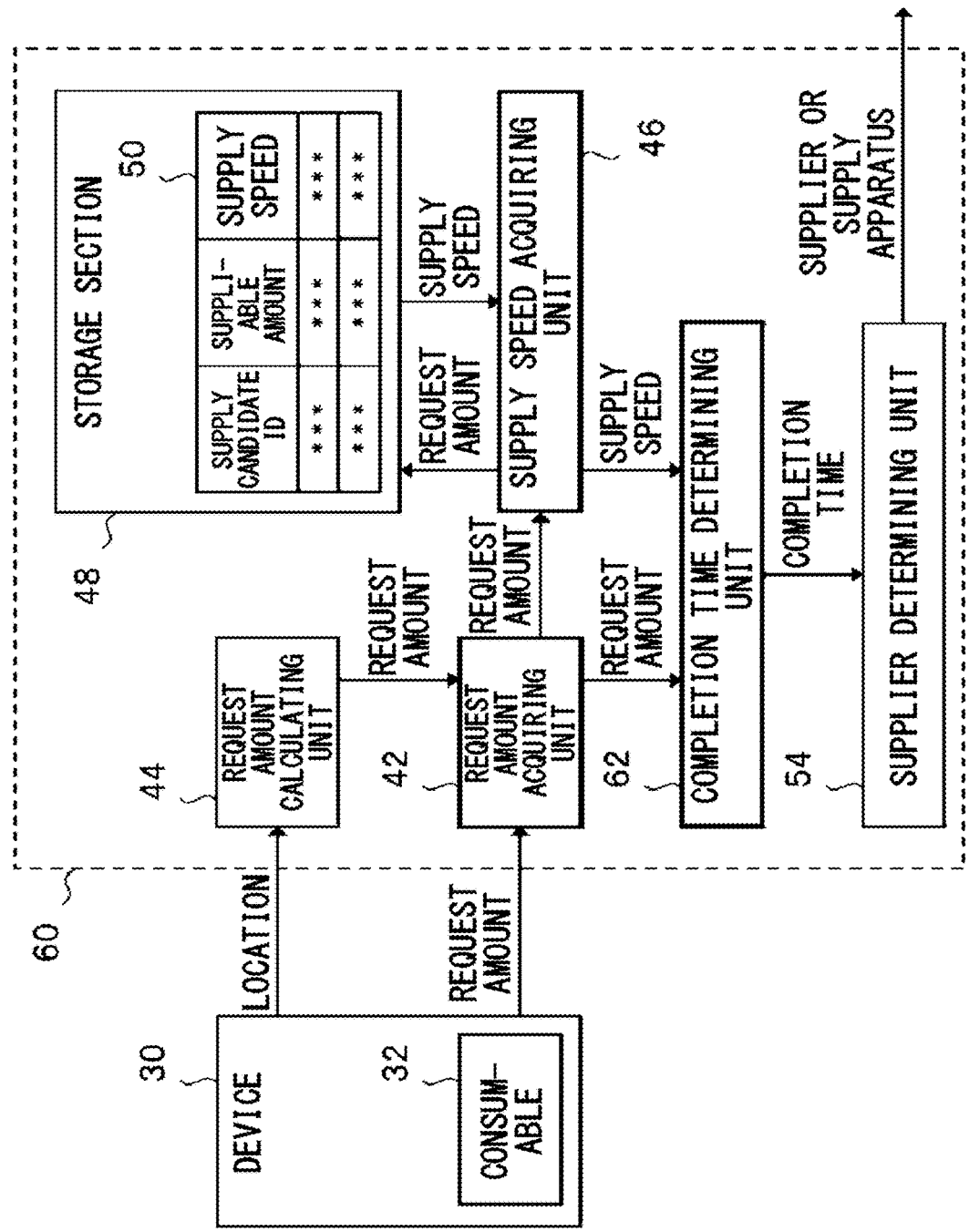
FIG. 2 schematically shows one example of a system configuration of an information processing apparatus 60.

FIG. 2 schematically shows one example of a system configuration of an information processing apparatus 60. The information processing apparatus 60 is different from the information processing apparatus 40 in the point that the information processing apparatus 60 includes a completion time determining unit 62 instead of the supply time period determining unit 52. Also, the supplier determining unit 54 of the information processing apparatus 60 is different from the supplier determining unit 54 of the information processing apparatus 40 in the point that the supplier or the supply apparatus of the consumable is determined based on the completion time determined by the completion time determining unit 62. Regarding points other than the above-described different point, the information processing apparatus 60 may have a configuration similar to that of the information processing apparatus 40. The information processing apparatus 60 may be one example of the information processing system. The completion time determining unit 62 may be one example of the completion time period determining unit.

In the present embodiment, the completion time determining unit 62 receives the information related to the request amount of the consumable 32 in the device 30 from the request amount acquiring unit 42, for example. The completion time determining unit 62 receives the information related to the supply speed of the supply candidate which can supply the request amount of the consumable from the supply speed acquiring unit 46, for example.

In the present embodiment, the completion time determining unit 62 determines a completion time which is a time at which a provision of the request amount of the consumable 32 is completed based on the information related to the request amount acquired by the request amount acquiring unit 42 and the information related to the supply speed acquired by the supply speed acquiring unit 46 with respect to each of the supply candidates which can supply the request amount of the consumable 32. For example, the completion time determining unit 62 determines the completion time based on (i) a period from a time at which a transaction is established to a time at which a provision of the consumable 32 is started and (ii) the supply time period of each supply candidate.

In one embodiment, if a merging time is not designated, the completion time determining unit 62 calculates the supply time period of each supply candidate according to a procedure similar to that of the supply time period determining unit 52. Also, the completion time determining unit 62 determines a period from a time at which the transaction is established to a time at which the provision of the consumable 32 is started. For example, the completion time determining unit 62 determines the above-described period by predicting a period until both the supply candidate and the device 30 merge with each other based on the current location of the device 30 and the current location of each supply candidate. The completion time determining unit 62 determines the completion time period by adding, to the current time point, the supply time period of each supply candidate and the period from the time at which the transaction is established to the time at which the provision of the consumable 32 is started, for example.

On the other hand, in another embodiment, if the merging time is designated, the completion time determining unit 62 calculates the supply time period of each supply candidate according to a procedure similar to that of the supply time period determining unit 52. The completion time determining unit 62 determines the completion time by adding the supply time period of each supply candidate to the merging time.

Figure 3:
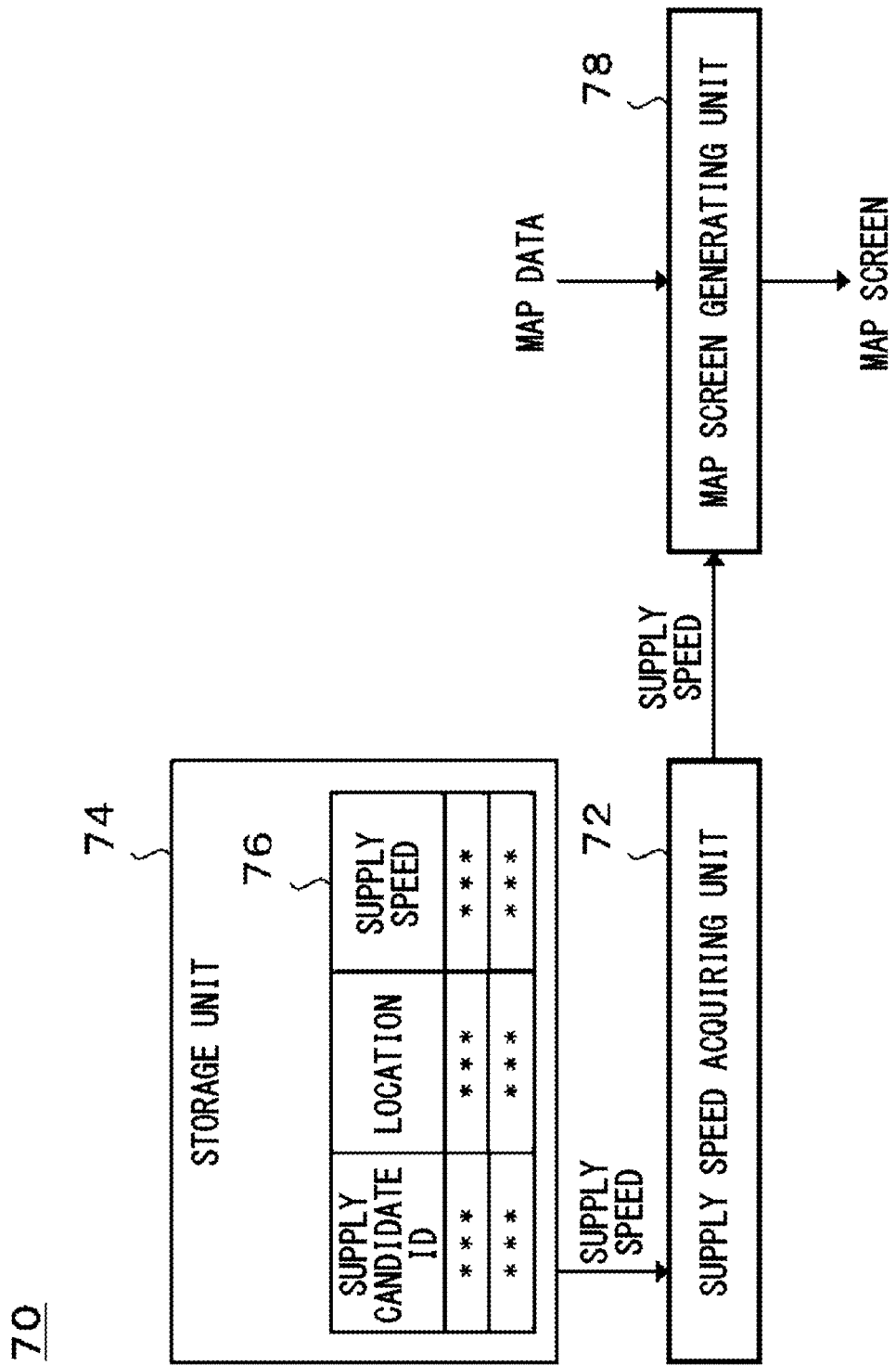
FIG. 3 schematically shows one example of a system configuration of an information processing apparatus 70.

FIG. 3 schematically shows one example of a system configuration of an information processing apparatus 70. The information processing apparatus 70 may be one example of the information processing system. The information processing apparatus 70 generates a screen for a user interface, used in matching of a demander and a supplier of the consumable 32, for example. In the present embodiment, the information processing apparatus 70 generates a map screen on which an icon showing the supply candidate of the consumable 32 is displayed on the map.

[System Configuration of Information Processing Apparatus 70]

In the present embodiment, the information processing apparatus 70 includes a supply speed acquiring unit 72 and a screen generating unit 78. The information processing apparatus 70 may further include a storage unit 74. The storage unit 74 may store a data table 76. In the present embodiment, the data table 76 makes identification information of each supply candidate, information related to a location of each supply candidate, and information related to a supply speed of the consumable 32 of each supply candidate be corresponded to each other, and stores them. The location of each supply candidate may be the current location or may be an expected location at a specified future time.

In the present embodiment, the supply speed acquiring unit 72 acquires the information related to a supply speed of at least part of the supply candidates among one or more supply candidates which can supply the consumable. The supply speed acquiring unit 72 may also acquire the information related to the location of the above-described supply candidate. The supply speed acquiring unit 72 sends the information related to the acquired supply speed to the map screen generation unit 78. The supply speed acquiring unit 72 may also send the information related to the acquired location to the map screen generation unit 78.

The supply speed acquiring unit 72 may access to the storage unit 74 and refer to the data table 76 to acquire the information related to the supply speed of the supply candidate and the location information of the supply candidate. For example, the supply speed acquiring unit 72 acquires information showing a geographic range displayed on the map screen. The supply speed acquiring unit 72 takes the information related to the location of each supply candidate as the key, refers to the data table 76, and acquires information related to a supply speed of at least part of the supply candidates among one or more supply candidates existing inside the geographic range displayed on the map screen. At this moment, the supply speed acquiring unit 72 may also acquire the information related to the locations of the at least part of the supply candidates.

In one embodiment, the supply speed acquiring unit 72 acquires the information related to the supply speed with respect to all of the supply candidates existing inside the geographic range displayed on the map screen. In another embodiment, the supply speed acquiring unit 72 acquires the information related to the supply speed with respect to the supply candidate which satisfies a specified condition among the supply candidates existing inside the geographic range displayed on the map screen. As the specified condition, conditions, such as "the supply speed is larger than a predetermined value", "in a case where the supply candidates are arranged in a descending order of the supply speeds, the supply candidate is positioned higher than a predetermined ranking", and "the type of the supply apparatus satisfies a predetermined condition", may be exemplified.

In the present embodiment, the screen generating unit 78 acquires the information related to the supply speed of the supply candidate described above from the supply speed acquiring unit 72, for example. The screen generating unit 78 may also acquire the information related to the location of the supply candidate described above from the supply speed acquiring unit 72. The screen generating unit 78 generates, based on (i) supply location information related to a location and (ii) information related to a supply speed of the consumable 32 of each of one or more supply candidates, a map screen on which one or more icons showing a location of each of at least part of the supply candidates are displayed on the map. The screen generating unit 78 may determine at least one of a shape, a pattern, a color, and a size of the one or more icons based on the information related to the supply speed(s) of the supply candidate(s) which corresponds to the icon(s).

In one embodiment, the screen generating unit 78 determines at least one of the shape, the pattern, the color, and the size of the icon in accordance with a value of the supply speed of each supply candidate. In another embodiment, the screen generating unit 78 determines at least one of the shape, the pattern, the color, and the size of the icon in accordance with a division of the supply speed of each supply candidate. Furthermore, in another embodiment, the screen generating unit 78 determines at least one of the shape, the pattern, the color, and the size of the icon in accordance with the type of the supply apparatus that each supply candidate has.

[Specific Configuration of Each Unit of Information Processing Apparatus 70]

Each unit of the information processing apparatus 70 may be realized by hardware, or may be realized by software, or may be realized by hardware and software. Each unit of the information processing apparatus 70 may be realized by a single server or may be realized by a plurality of servers.

If at least part of components included in the information processing apparatus 70 are realized by software, the components may be realized by starting the software or a program which specifies operations related to the components in an information processing apparatus which is a general configuration. The above-described information processing apparatus may include (i) a data processing apparatus having a processor, such as CPU and GPU, ROM, RAM, a communications interface and the like, (ii) an input apparatus such as a keyboard, a touch panel, a camera, a microphone, various sensors, and a GPS receiver, (iii) an output apparatus such as a display apparatus, a speaker, and a vibration apparatus, and (iv) a storage apparatus (including an external storage apparatus) such as a memory and HDD.

At least part of the information processing apparatus 70 may be realized on a virtual server or on a cloud system.

In the above-described information processing apparatus, the above-described data processing apparatus or storage apparatus may store the above-described software or program. By being executed by the processor, the above-described software or program causes the above-described information processing apparatus to execute the operations specified by the software or program. The above-described software or program may have been stored in a non-transitory computer readable recording medium.

Figure 4:
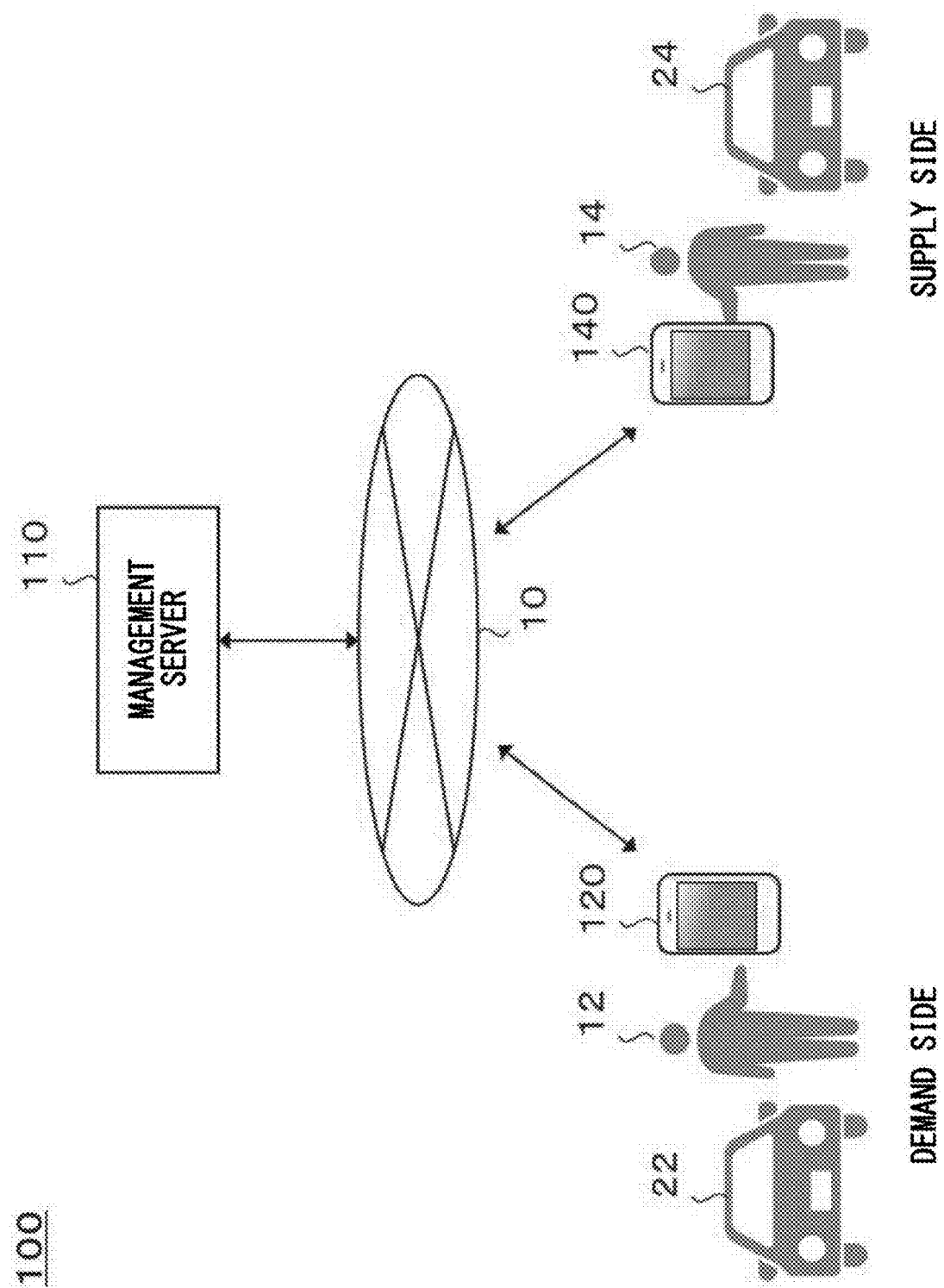
FIG. 4 schematically shows one example of a system configuration of a transaction management system 100.

FIG. 4 schematically shows one example of a system configuration of a transaction management system 100. In the present embodiment, the transaction management system 100 matches a demander 12 which desires supplement or a replacement of a consumable of a vehicle 22 and a supplier 14 which can supply the consumable. Also, the transaction management system 100 manages an implementation of a transaction after the transaction of the consumable is established according to the above-described matching.

To describe briefly, in the present embodiment, a transaction management method of a consumable using the transaction management system 100 will be described by using a case, as an example, where the consumable is electric power, the device which uses the consumable is the vehicle 22 of the demander 12, and charging a battery of the vehicle 22 is performed using a vehicle 24 of a supplier 14.

More specifically, in the present embodiment, the vehicle 22 is an electric automobile, and as a use form of the vehicle 24, forms, such as (i) supplying electricity from an on-vehicle power generating apparatus, a battery, or a charging apparatus mounted on the vehicle 24 to a battery of the vehicle 22 and (ii) mounting a mobile power generating apparatus, a battery, or a charging apparatus on the vehicle 24 and supplying electricity from the power generating apparatus, the battery, or the charging apparatus to the battery of the vehicle 22, may be exemplified.

In the present embodiment, the vehicle 24 is selected, for example, by the demander 12, from among one or more candidates (referred to as supply candidates in some cases) which can supply electric power to the vehicle 22. The vehicle 24 may be selected also based on a predetermined rule. The one or more supply candidates may include at least one of a power storage apparatus, a charging apparatus, and a power generating apparatus. The one or more supply candidates may include at least one of a mobile power storage apparatus, a mobile charging apparatus, and a mobile power generating apparatus.

The one or more supply candidates may include at least two types from among three types of the power storage apparatus, the charging apparatus, and the power generating apparatus. The one or more supply candidates may include at least one of the power generating apparatus, the power storage apparatus, and the charging apparatus. The power generating apparatus may include a power generating apparatus using an internal combustion engine. The one or more supply candidates may include a plurality of supply apparatuses having different rated outputs or rated voltages. The plurality of supply apparatuses may include a plurality of power storage apparatuses having different rated outputs or rated voltages. The plurality of supply apparatuses may include a plurality of charging apparatuses having different rated outputs or rated voltages. The plurality of supply apparatuses may include a plurality of power generating apparatuses having different rated outputs or rated voltages.

The vehicle 22 may be one example of a mobile body, and the electric power may be one example of energy for driving the mobile body. The electric power may be one example of the consumable. The vehicle 24 may be one example of the supply apparatus. The rated output or rated voltage may be one example of a standard or quality of the consumable. The rated output or rated voltage may be one example of a specification or standard of the supply apparatus. Unless a technical contradiction occurs, the vehicle 22 may have a configuration similar to that of the device 30 described with reference to FIG. 1 to FIG. 3. Also, the electric power may also have a configuration similar to that of the consumable 32.

[System Configuration of Transaction Management System 100]

In the present embodiment, the transaction management system 100 includes a management server 110, a communication terminal 120 used by the demander 12, and a communication terminal 140 used by the supplier 14. The management server 110, the communication terminal 120, and the communication terminal 140 mutually send and receive information via a communication network 10.

The transaction management system 100 and the management server 110 may be one example of the information processing system. Unless a technical contradiction occurs, the transaction management system 100 and the management server 110 or each unit thereof may have a configuration similar to that of at least one of the information processing apparatus 40, the information processing apparatus 60, and the information processing apparatus 70 described with reference to FIG. 1 to FIG. 3, or each unit thereof.

In the present embodiment, the communication network 10 transmits information between the management server 110 and at least one of the communication terminal 120 and the communication terminal 140. The communication network 10 may also transmit information between the communication terminal 120 and the communication terminal 140. The communication network 10 may be a wired communication transmission path, or may be a wireless communication transmission path, or may be a combination of the wireless communication transmission path and the wired communication transmission path. The communication network 10 may include a mobile communication network such as a mobile phone line network, may include a radio communication network such as wireless MAN, wireless LAN, Bluetooth (registered trademark), and a short distance radio communication network, and may include a radio packet communication network, Internet, a dedicated line and the like.

In the present embodiment, the management server 110 sends and receives information to/from the communication terminal 120 and the communication terminal 140 via the communication network 10. The management server 110 may also send and receive the information to/from the vehicle 22 or the vehicle 24 via the communication network 10. The management server 110 may be realized by a single server, or may be realized by a plurality of servers.

In the present embodiment, the communication terminal 120 sends and receives the information to/from the management server 110 and the communication terminal 140 via the communication network 10. The communication terminal 120 may send and receive the information to/from the vehicle 22 by wireless communication or wired communication. The communication terminal 140 sends and receives the information to/from the management server 110 and the communication terminal 120 via the communication network 10. The communication terminal 140 may send and receive the information to/from the vehicle 24 by wireless communication or wired communication. As the communication terminal 120 or the communication terminal 140, a personal computer, a mobile terminal, and the like may be exemplified. As the mobile terminal, a mobile phone, a smartphone, a PDA, a tablet, a notebook computer or laptop computer, a wearable computer, and the like may be exemplified.

For example, the communication terminal 120 is realized by installing a program for demanders into the information processing apparatus, and the communication terminal 140 is realized by installing a program for suppliers into the information processing apparatus. In another embodiment, the communication terminal 120 and the communication terminal 140 are realized by installing a program having functions for both demanders and suppliers into the information processing apparatus.

[Specific Configuration of Each Unit of Transaction Management System 100]

Each unit of the transaction management system 100 may be realized by hardware, or may be realized by software, or may be realized by hardware and software. Each unit of the transaction management system 100 may be realized by a single server or may be realized by a plurality of servers.

If at least part of components included in the transaction management system 100 are realized by software, the components may be realized by starting the software or a program which specifies operations related to the components in an information processing apparatus which has a general configuration. The above-described information processing apparatus may include (i) a data processing apparatus having a processor such as CPU and GPU, ROM, RAM, a communications interface, and the like, (ii) an input apparatus such as a keyboard, a touch panel, a camera, a microphone, various sensors, and a GPS receiver, (iii) an output apparatus such as a display apparatus, a speaker, and a vibration apparatus, and (iv) a storage apparatus (including an external storage apparatus) such as a memory and HDD. At least part of the transaction management system 100 may be realized on a virtual server or on a cloud system.

In the above-described information processing apparatus, the above-described data processing apparatus or storage apparatus may store the above-described software or program. By being executed by the processor, the above-described software or program causes the above-described information processing apparatus to execute the operations specified by the software or program. The above-described software or program may have been stored in a non-transitory computer readable recording medium.

[Summary of Processes in Transaction Management System 100]

In the present embodiment, the management server 110 matches the demander 12, and the supplier 14 or the vehicle 24. For example, information related to one or more suppliers 14 or vehicles 24 is stored in the management server 110, as the information related to the one or more supply candidates which can supply electric power. For example, each of the one or more suppliers 14 accesses to the management server 110 by using the vehicle 24 or the communication terminal 140 and executes a registration processing; accordingly, the information related to each supply candidate is registered in the management server 110. The management server 110 may have stored information related to the one or more supply candidates with respect to each of a plurality of types of the consumables.

As the information related to the one or more supply candidates, identification information of each supply candidate, a current location of each supply candidate, an expected location at a future time of each supply candidate, personal information of each supply candidate, a specification of each supply apparatus, a suppliable time period, a suppliable area, a suppliable electric power amount, a standard or quality of a suppliable electric power, a price, a settlement method, and the like may be exemplified. As the standard or quality of the electric power, a voltage, a voltage variation range, a power feeding speed or a charging efficiency, an adaptor shape, and the like may be exemplified. The suppliable electric power amount is determined based on, for example, a current battery residual amount of the vehicle 24. The suppliable electric power amount may be also determined based on the current battery residual amount of the vehicle 24 and path information.

For example, in a case where the battery residual amount of the vehicle 22 is lowered due to an unexpected traffic congestion, an atmospheric temperature increase, and the like and it becomes difficult to arrive at the destination or the closest charging station, the demander 12 accesses to the management server 110 via the communication terminal 120, for example. Then, the demander 12 requests the management server 110 to extract candidates which can supply the electric power to the vehicle 22. The charging station may be one example of the supply facility of the consumable.

The communication terminal 120 may also make information related to the requested electric power amount (referred to as electric power request amount in some cases) be corresponded to the above-described request (referred to as an extraction request in some cases) and send the information to the management server 110. In one embodiment, the extraction request includes information related to the electric power request amount. In another embodiment, the communication terminal 120 makes the information for calculating the electric power request amount be corresponded to the extraction request and sends the information to the management server 110. The information related to the electric power request amount may be information showing the electric power request amount or may be the information for calculating the electric power request amount. The electric power request amount may be determined by the management server 110 or may be determined by the communication terminal 120. The electric power request amount may be one example of the request amount of the consumable.

The electric power request amount is determined based on, for example, a location of the vehicle 22. As the location of the vehicle 22, a location of the demander 12 or the communication terminal 120 may also be used. The location of the vehicle 22 may be a current location, or may be a location in a specified future time period. The location in the specified future time period may be a location calculated according to a simulation, or may be a location designated by the demander 12.

The electric power request amount may be determined based on (i) information related to the location of the vehicle 22, and (ii) at least one of information related to the battery residual amount of the vehicle 22, path information of the vehicle 22, map information, traffic information and weather information. The map information includes, for example, information related to a location of a charging station, difference in height of roads, and the like in an arbitrary area. The traffic information includes, for example, information related to a traffic law, traffic accident, traffic rule, traffic congestion, closure of roads, and the like in an arbitrary area.

The weather information includes, for example, information related to the weather, atmospheric temperature, humidity, and the like in an arbitrary area. The battery residual amount may be one example of a usable amount of the consumable.

In one embodiment, the electric power request amount is determined based on the information related to the current location of the vehicle 22, and the information related to the location of the destination of the vehicle 22 or the closest charging station. The current location of the vehicle 22 may be determined based on an output of a GPS receiver mounted on the vehicle 22 or an output of a GPS receiver mounted on the communication terminal 120. In another embodiment, the electric power request amount is determined based on the information related to a specified location designated by the demander 12 and the information related to the location of the destination of the vehicle 22 or the closest charging station. Furthermore, in another embodiment, the electric power request amount may be determined also based on the information related to the current location of the vehicle 22, the information related to the location of the destination of the vehicle 22 or the closest charging station, and the information related to the battery residual amount of the vehicle 22.

In another embodiment, the electric power request amount may be determined also based on the information related to the current location of the vehicle 22, the information related to the location of the destination of the vehicle 22 or the closest charging station, the information related to the battery residual amount of the vehicle 22, and map information from the current location of the vehicle 22 to the destination of the vehicle 22 or the closest charging station. Furthermore, in another embodiment, the electric power request amount may be determined also based on the information related to the current location of the vehicle 22, the information related to the location of the destination of the vehicle 22 or the closest charging station, the information related to the battery residual amount of the vehicle 22, the map information from the current location of the vehicle 22 to the destination of the vehicle 22 or the closest charging station, and traffic information from the current location of the vehicle 22 to the destination of the vehicle 22 or the closest charging station.

As the management server 110 receives the extraction request from the communication terminal 120, the management server 110 extracts the suppliers 14 or the vehicles 24 which can supply the electric power of equal to or more than the electric power request amount from among the registered one or more suppliers 14 or vehicles 24, as the supply candidates. The management server 110 may also extract the supply candidates from among the suppliers 14 or vehicles 24 existing in the vicinity of the current location of the vehicle 22. For example, the management server 110 determines that the vehicle 24 exists in the vicinity of the vehicle 22 if a distance between the vehicle 24 and the vehicle 22 is smaller than a predetermined value, or if the vehicle 24 and the vehicle 22 can merge with each other within a predetermined time period. Subsequently, the management server 110 generates a screen showing the extraction result and sends the screen to the communication terminal 120.

In one embodiment, a time period (referred to as charging time period in some cases) from a time at which the charging starts to a time at which the charging ends is presented on the screen showing the extraction result, the time corresponded to the identification information of each supply candidate. The charging time period is calculated by dividing the electric power request amount by a power feeding speed or charging efficiency of each supply candidate. In another embodiment, a period (referred to as a transaction time period in some cases) from a time at which a transaction is established to a time at which the electricity corresponding to the electric power request amount is charged is presented on the screen showing the extraction result, the period corresponded to the identification information of each supply candidate. The time point at which the transaction is established may be a time of matching, or may be a time of determining or deciding a transaction condition, or may be a time of notifying the determined transaction condition. Furthermore, in another embodiment, a unit price or price of the electric power which is corresponded to the identification information of each supply candidate and is to be supplied is presented on the screen showing the extraction result. The charging time period may be one example of the supply time period. The transaction time period may be one example of the completion time period.

The communication terminal 120 displays the screen showing the extraction result on the display unit of the communication terminal 120 to make the demander 12 select the supplier 14 which is to be the transaction counterparty from among the one or more supply candidates displayed on the screen. As the demander 12 operates the communication terminal 120 and selects the supplier 14 as the transaction counterparty, the communication terminal 120 sends the selection result according to the demander 12 to the management server 110 and also requests the management server 110 for an execution of processing for establishing the transaction. Accordingly, a matching between the demander 12 and the supplier 14 can be done.

According to the present embodiment, the electric power request amount is determined based on the location of the demander 12. For that reason, even if the electric power of a necessary amount for full charging of the battery is hardly procured at one time, the necessary amount of electric power for arriving at the destination or the closest charging station can be procured by respectively procuring a small amount of electric power from one or more suppliers 14, for example. As a result, a driver of an electric automobile can use an individual home, a mobile power generator, another electric automobile and the like as a small-scale charging station, and worries of exhaustion of electricity are alleviated. Also, according to the present embodiment, the demander 12 may select the transaction counterparty in total consideration of a charging time period, a transaction time period, a price, and the like. For that reason, the demander 12 may select an optimal transaction counterparty according to the situation.

Further, in the present embodiment, the management server 110 manages the implementation of the transaction. For example, the management server 110 monitors whether or not the transaction has been implemented as the transaction condition which is determined according to the matching. The management server 110 may also collect information related to the current states of the vehicle 22 and the vehicle 24 via the communication terminal 120 and the communication terminal 140 and manage the transaction based on the information.

For example, the management server 110 collects the information related to the current locations of the vehicle 22 and the vehicle 24 to support the merging of both the vehicle 22 and the vehicle 24. Also, the management server 110 collects information related to the battery residual amounts of the vehicle 22 and the vehicle 24, calculates a transaction amount, and executes a fare adjustment process. Accordingly, the supplier 14 can receive a reasonable compensation even if a charging loss occurs due to the specification or performance of the vehicle 22.

In the present embodiment, the case where the consumable is electric power or electricity and the device which uses the consumable is an electric automobile was described. However, the consumable and the device which uses the consumable are not limited to the present embodiment. In another embodiment, the vehicle 22 may be a vehicle which is driven by using an engine, a motor, a fuel cell, and the like as a power source. In this case, the consumable may be an energy source, such as light oil, gasoline, natural gas, propane gas, alcohols, and hydrogen. The consumable may be consumer goods, such as oil, coolant, a tire, and a battery.

In the present embodiment, the case where the demander 12 and the supplier 14 access to the management server 110 by using the communication terminal 120 and the communication terminal 140 was described. However, the transaction management system 100 is not limited to the present embodiment. In another embodiment, the vehicle 22 may have a communication function, and the demander 12 may access to the management server 110 via the vehicle 22. Also, the vehicle 24 may also have a communication function, and the supplier 14 may access to the management server 110 via the vehicle 24. In this case, the vehicle 22 may include at least part of the components of the communication terminal 120, and the vehicle 24 may include at least part of the components of the communication terminal 140.

Furthermore, in another embodiment, the communication terminal 120 or the vehicle 22 and the communication terminal 140 or the vehicle 24 may also mutually send and receive the information in a peer-to-peer (P2P) manner. In this case, a system including at least one of the communication terminal 120 and the communication terminal 140 or including the communication terminal 120 and the communication terminal 140 may be one example of the information processing system. Also, a system including at least one of the vehicle 22 and the vehicle 24 or including the vehicle 22 and the vehicle 24 may be one example of the information processing system.

Figure 5:
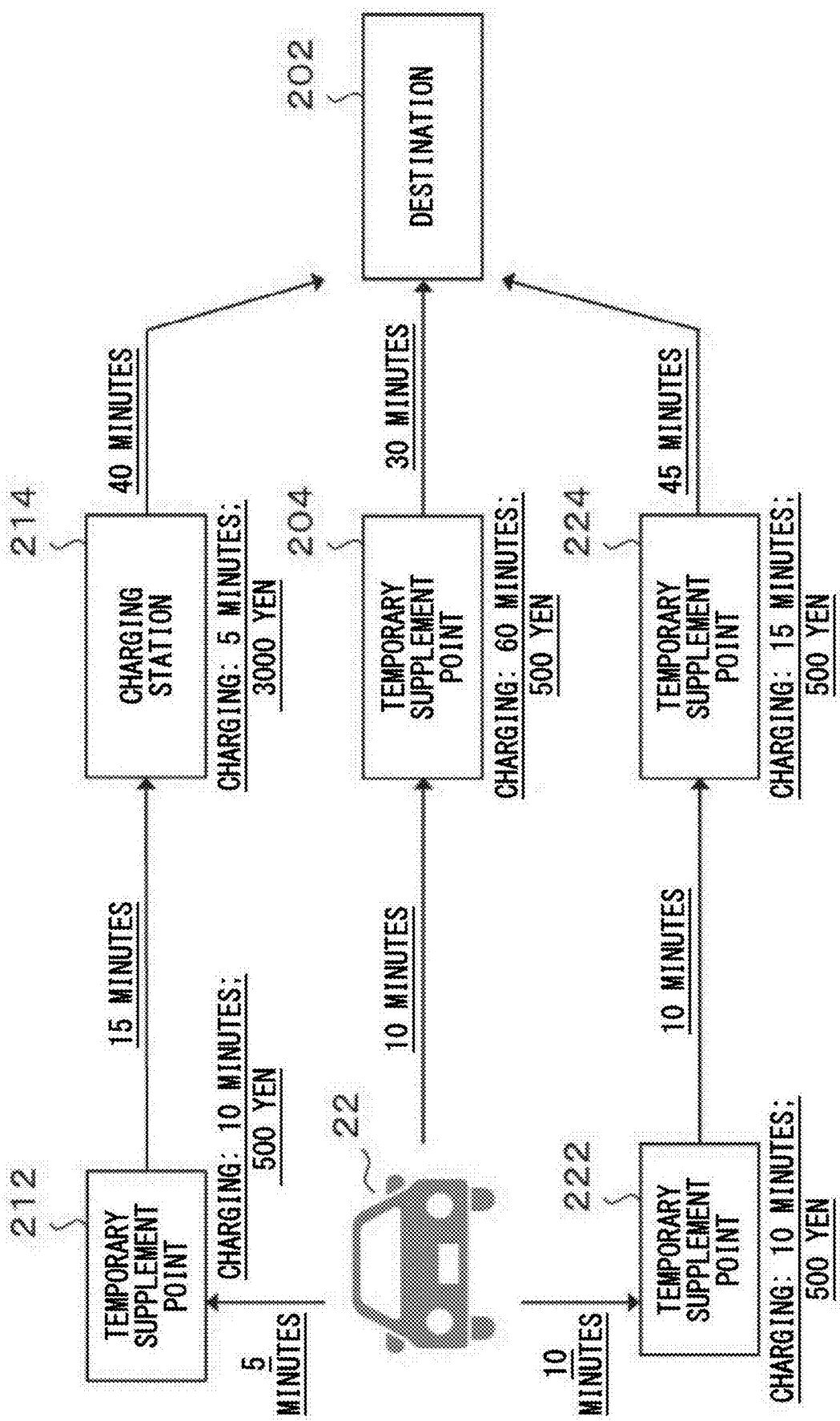
FIG. 5 schematically shows one example of a path selecting method using the transaction management system 100.

One example of a path selecting method using the transaction management system 100 is schematically shown by using FIG. 5. For example, in a case where the battery residual amount of the vehicle 22 is lowered and the vehicle 22 hardly arrives at the destination 202, even the closest charging station 214, the demander 12 operates the communication terminal 120 and sends the extraction request to the management server 110. In this case, the management server 110 extracts the supply candidates while variously changing the extraction condition, and presents the extraction result, for example, the following (i) to (iii).

(i) Moving to a destination 202 after receiving a supply of electricity from a supplier A at a temporary supplement point 204. In this case, the charging time period required for charging of the electric power amount necessary for moving from the temporary supplement point 204 to a destination 202 is 60 minutes and the cost is 500 yen. (ii) Moving to the charging station 214 after receiving the supply of electricity from a supplier B at a temporary supplement point 212. Next, a movement to the destination 202 after charging at the charging station 214 is made. In this case, the charging time period required for charging of the electric power amount necessary for moving from the temporary supplement point 212 to the charging station 214 is 10 minutes and the cost is 500 yen. Also, the charging time period required for charging of the electric power amount necessary for moving from the charging station 214 to the destination 202 is 5 minutes and the cost is 3000 yen. (iii) Moving to the temporary supplement point 224 after receiving the supply of electricity from a supplier C at a temporary supplement point 222. Next, a movement to the destination 202 after receiving the supply of electricity from a supplier D at a temporary supplement point 224 is made. In this case, the charging time period required for charging of the electric power amount necessary for moving from the temporary supplement point 222 to the temporary supplement point 224 is 10 minutes and the cost is 500 yen. Also, the charging time period required for charging of the electric power amount necessary for moving from the temporary supplement point 224 to the destination 202 is 15 minutes and the cost is 500 yen.

The demander 12 considers the cost and the required time period to the destination in each case of the extraction results (i) to (iii) to select the transaction counterparty and the path. For example, if the cost, a total running distance, a total running time period, and the like are considered as important, the demander 12 selects the extraction result (i). On the other hand, if the required time period to the destination is considered as important, the demander 12 selects the extraction result (ii).

Figure 6:
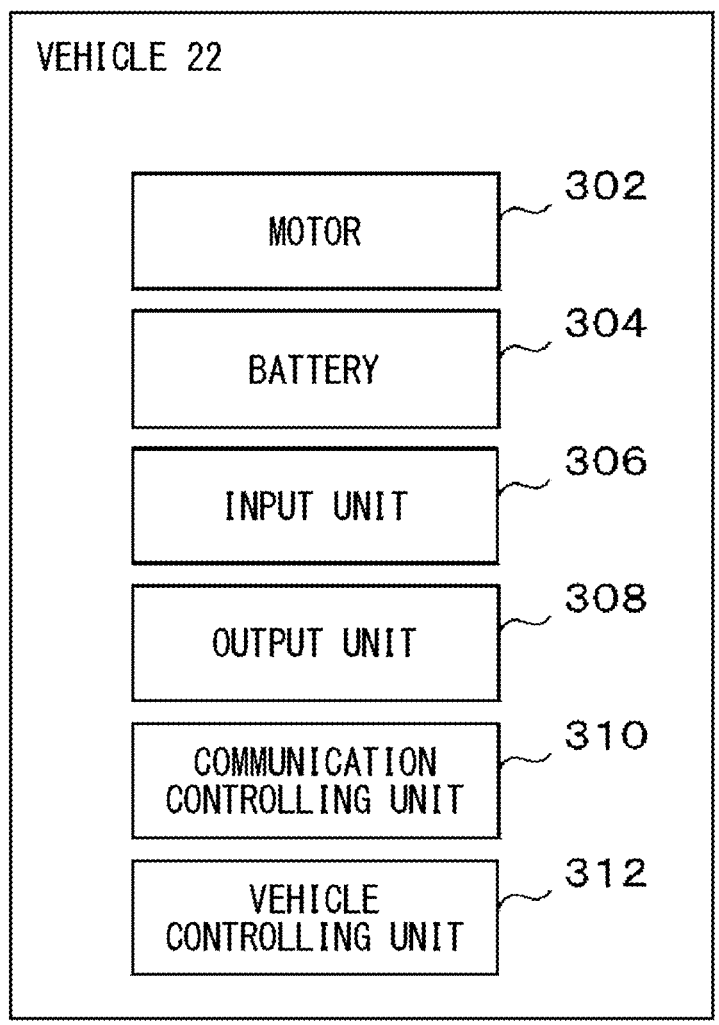
FIG. 6 schematically shows one example of a system configuration of a vehicle 22.

FIG. 6 schematically shows one example of a system configuration of the vehicle 22. Note that the vehicle 24 may have a configuration similar to that of the vehicle 22. In the present embodiment, the vehicle 22 includes a motor 302 to drive the vehicle 22, a battery 304 to supply electric power to the motor 302, an input unit 306, an output unit 308, a communication controlling unit 310, and a vehicle controlling unit 312.

In the present embodiment, the input unit 306 receives an input of information. The input unit 306 receives an instruction from a user, for example. As the input unit 306, a keyboard, a pointing device, a touch panel, a microphone, a camera, a sensor, a GPS receiver, and the like may be exemplified. The output unit 308 outputs the information. As the output unit 308, a display apparatus, a speaker, a vibration apparatus, and the like may be exemplified.

In the present embodiment, the communication controlling unit 310 controls a communication between the vehicle 22 and an external device. The communication controlling unit 310 may be a communications interface. The vehicle controlling unit 312 controls operations of the vehicle 22. The vehicle controlling unit 312 may collect measurement values measured by various sensors mounted on the vehicle 22. The vehicle controlling unit 312 may send the collected information to the management server 110 or the communication terminal 120 via the communication controlling unit 310.

Each unit of the vehicle 22 may be realized by hardware, or may be realized by software, or may be realized by hardware and software. In a case where at least part of the components included in the vehicle 22 are realized by software, the components may be realized by starting the software or a program which specified operations related to the components in an information processing apparatus which is a general configuration. The above-described information processing apparatus may include (i) a data processing apparatus having a processor, such as CPU and GPU, ROM, RAM, a communications interface, and the like, (ii) an input apparatus such as a keyboard, a touch panel, a camera, a microphone, various sensors, and a GPS receiver, (iii) an output apparatus such as a display apparatus, a speaker, and a vibration apparatus, and (iv) a storage apparatus (including an external storage apparatus) such as a memory and HDD.

In the above-described information processing apparatus, the above-described data processing apparatus or storage apparatus may store the above-described software or program. By being executed by the processor, the above-described software or program causes the above-described information processing apparatus to execute the operations specified by the software or program. The above-described software or program may have been stored in a non-transitory computer readable recording medium.

Figure 7:
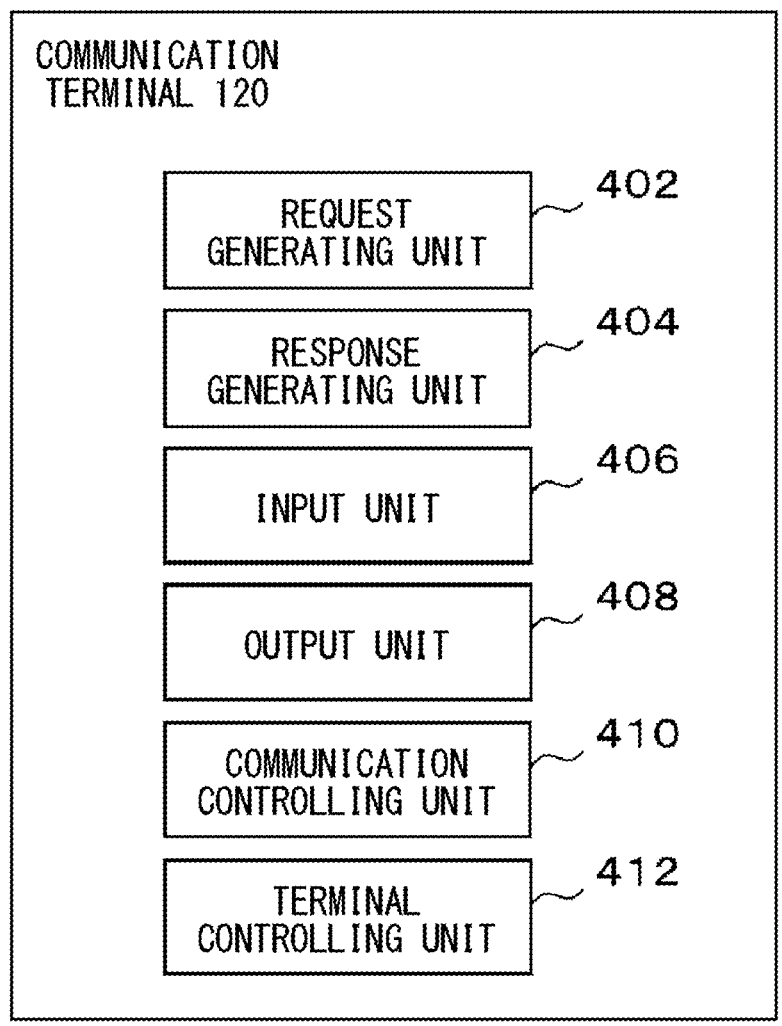
FIG. 7 schematically shows one example of a system configuration of a communication terminal 120.

FIG. 7 schematically shows one example of a system configuration of a communication terminal 120. Note that the communication terminal 140 may have a configuration similar to that of the communication terminal 120. In the present embodiment, the communication terminal 120 includes a request generating unit 402, a response generating unit 404, an input unit 406, an output unit 408, a communication controlling unit 410, and a terminal controlling unit 412.

In the present embodiment, the request generating unit 402 generates a request to an external device. The request generating unit 402 sends the generated request to the external device via the communication controlling unit 410. The response generating unit 404 receives a request from the external device. The response generating unit 404 generates a response with respect to the received request. The response generating unit 404 may also determine whether or not to respond to the above-described request. The response generating unit 404 sends the generated response to the sender of the above-described request via the communication controlling unit 410.

In the present embodiment, the input unit 406 receives an input of information. The input unit 406 receives an instruction from a user, for example. As the input unit 406, a keyboard, a pointing device, a touch panel, a microphone, a camera, a sensor, a GPS receiver, and the like may be exemplified. The output unit 408 outputs information. As the output unit 408, a display apparatus, a speaker, a vibration apparatus, and the like may be exemplified.

In the present embodiment, the communication controlling unit 410 controls a communication between the communication terminal 120 and an external device. The communication controlling unit 410 may be a communications interface. The terminal controlling unit 412 controls operations of the communication terminal 120. The terminal controlling unit 412 may collect measurement values measured by various sensors mounted on the communication terminal 120. The terminal controlling unit 412 may control the output unit 408 to cause the output unit 408 to output the information. For example, the terminal controlling unit 412 sends data of any display screen to the display apparatus of the output unit 408 to cause the display apparatus to display the display screen. The terminal controlling unit 412 may send the collected information to the management server 110 or the communication terminal 140 via the communication controlling unit 410.

Figure 8:
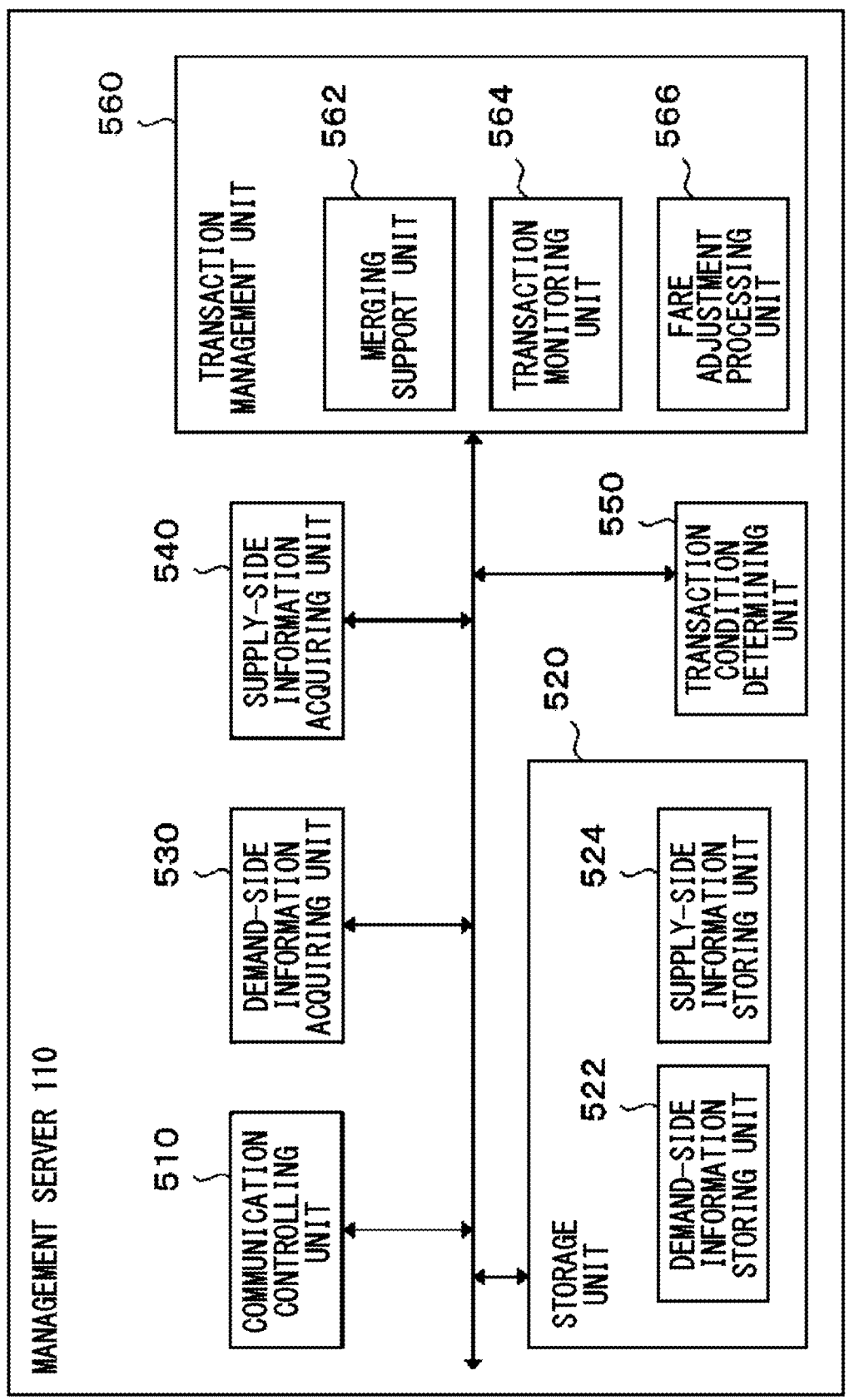
FIG. 8 schematically shows one example of a system configuration of a management server 110.

FIG. 8 schematically shows one example of a system configuration of a management server 110. In the present embodiment, the management server 110 includes a communication controlling unit 510, a storage unit 520, a demand-side information acquiring unit 530, a supply-side information acquiring unit 540, a transaction condition determining unit 550, and a transaction management unit 560. The storage unit 520 has a demand-side information storing unit 522 and a supply-side information storing unit 524, for example. The transaction management unit 560 includes a merging support unit 562, a transaction monitoring unit 564, and a fare adjustment processing unit 566, for example. The supply-side information storing unit 524 may be one example of the storage unit. The demand-side information acquiring unit 530 may be one example of the device location acquiring unit and the residual amount acquiring unit. The transaction condition determining unit 550 may be one example of the information processing system.

In the present embodiment, the communication controlling unit 510 controls a communication between the management server 110 and an external device. The communication controlling unit 510 may be a communications interface. The storage unit 520 stores various information.

The demand-side information storing unit 522 stores information related to the demander 12 or the vehicle 22. As the information related to the demander 12 or the vehicle 22, identification information of each demander or each vehicle, an address of a communication terminal of each demander or of each vehicle, a current location of each demander or each vehicle, path information of each demander or each vehicle, personal information of each demander, a specification of each vehicle, measurement values measured by various sensors mounted on the communication terminal of each demander or on each vehicle, and the like may be exemplified.

As the specification of each vehicle, a vehicle type, a standard of each unit of a vehicle, a battery capacity, a rated value and an actual value of battery characteristics, a rated value and an actual value of fuel consumption or electric utility consumption, a charging efficiency, and the like may be exemplified. As the personal information of each demander, a telephone number, a credit card number, a bank account number, a face picture, a usage history of services provided by the management server 110, an evaluation from another user, and the like may be exemplified.

The supply-side information storing unit 524 stores information related to the supplier 14 or the vehicle 24 as the information related to the supply candidates. As the information related to the supplier 14 or the vehicle 24, (i) information related to fundamental characteristics of each supplier or each vehicle, such as identification information of each supplier or each vehicle, personal information of each supplier, and a specification of each vehicle, (ii) information related to a current state of each supplier or each vehicle, such as a current location of each supplier or each vehicle, path information of each supplier or each vehicle, measurement values measured by various sensors mounted on a communication terminal of each supplier or on each vehicle, and response propriety to a request from the demander 12, and (iii) information related to a fundamental condition of a transaction, such as a suppliable time period of the consumable, a suppliable area of the consumable, an amount of a suppliable consumable, a standard or quality of the suppliable consumable, a price of the consumable, a settlement method, and modification propriety of the suppliable time period or area, and the like may be exemplified. The information related to the fundamental condition of the transaction may include information related to a preparation time period such as (i) a necessary preparation time period after the transaction establishment until a departure of each supplier, and (ii) a necessary preparation time period after the merging and until the beginning of the charging.

If the consumable is electric power, as the standard or quality of the consumable, a voltage, a voltage variation range, a power feeding speed or charging efficiency, an adaptor shape, and the like may be exemplified. The standard or quality of the consumable may be a rated value or may be an actual value. The power feeding speed or charging efficiency may be one example of the supply speed. As the specification of each vehicle, a vehicle type, a standard of each unit of a vehicle, a rated value and an actual value of battery characteristics, a rated value and an actual value of fuel consumption or electric utility consumption, and the like may be exemplified. As the personal information of each supplier, a telephone number, a credit card number, a bank account number, a face picture, a usage history of services provided by the management server 110, evaluation from another user, and the like may be exemplified.

The supply-side information storing unit 524 may also store the actual value of the power feeding speed or of the charging efficiency per combination of the specification of the battery of the vehicle 22 and the specification of the power feeding apparatus of the vehicle 24. The actual value of the power feeding speed or of the charging efficiency is calculated, for example, by the transaction monitoring unit 564 or the vehicle controlling unit 312. The power feeding apparatus may be one example of the supply apparatus.

As the specification of the battery, a type, a manufacturer, a model, a rated voltage, a rated capacity, and the like may be exemplified. As the specification of the power feeding apparatus, a type, a manufacturer, a model, a power feeding voltage, a power feeding manner, presence or absence of a booster apparatus or a quick charging apparatus, a capability of the booster apparatus or the quick charging apparatus, and the like may be exemplified. As the type of the power feeding apparatus, a power storage apparatus, a charging apparatus, a power generating apparatus, and the like may be exemplified. The type of the power feeding apparatus may be distinguished according to whether the power feeding apparatus is on-vehicle or mobile (referred to as ambulatory and portable in some cases). As the power storage apparatus, a battery for electric automobile, a battery for gasoline automobile, and the like may be exemplified. As the power generating apparatus, a power generator using an internal combustion engine, such as a general engine or a motor, a fuel cell, a natural energy power generating system, and the like may be exemplified.

In the present embodiment, the demand-side information acquiring unit 530 acquires the information related to the demander 12 or the vehicle 22 from the vehicle 22 or the communication terminal 120. The demand-side information acquiring unit 530 stores the acquired information in the demand-side information storing unit 522. The supply-side information acquiring unit 540 acquires the information related to the supplier 14 or the vehicle 24 from the vehicle 24 or the communication terminal 140. The supply-side information acquiring unit 540 stores the acquired information in the supply-side information storing unit 524.

In the present embodiment, the transaction condition determining unit 550 determines the transaction condition based on the request from the demander 12. As the transaction condition, a transaction counterparty, a transaction time or transaction time period, a transaction location, a standard or quality of a consumable to be transacted, an amount of the consumable to be transacted, a transaction price, and the like may be exemplified. The transaction price may be a unit price of the consumable to be transacted, or may be an amount obtained by multiplied the unit price of the consumable to be transacted by the amount of the consumable to be transacted.

For example, the transaction condition determining unit 550 compares a condition requested by the demander 12 to a condition presented by one or more suppliers 14 to extract the supply candidates which may be the transaction counterparty of the demander 12. Next, the transaction condition determining unit 550 determines the supplier 14 to be the transaction counterparty from among the extracted supply candidates according to a predetermined criteria or based on an instruction of the demander 12. At this moment, the transaction condition determining unit 550 may also determine another condition, such as a transaction time, a transaction location, and a transaction price. If it is difficult to provide all of the electric power request amounts by only one supply candidate, the transaction condition determining unit 550 may also select a plurality of suppliers 14 as the transaction counterparties.

In the present embodiment, the transaction management unit 560 manages the transaction between the demander 12 and the supplier 14. For example, the merging support unit 562 supports the merging of the demander 12 and the supplier 14. For example, the transaction monitoring unit 564 monitors the transaction situation of the consumable. For example, the fare adjustment processing unit 566 executes a fare adjustment process. The fare adjustment processing unit 566 may also use the monitoring result of the transaction monitoring unit 564 to execute the fare adjustment process.

Figure 9:
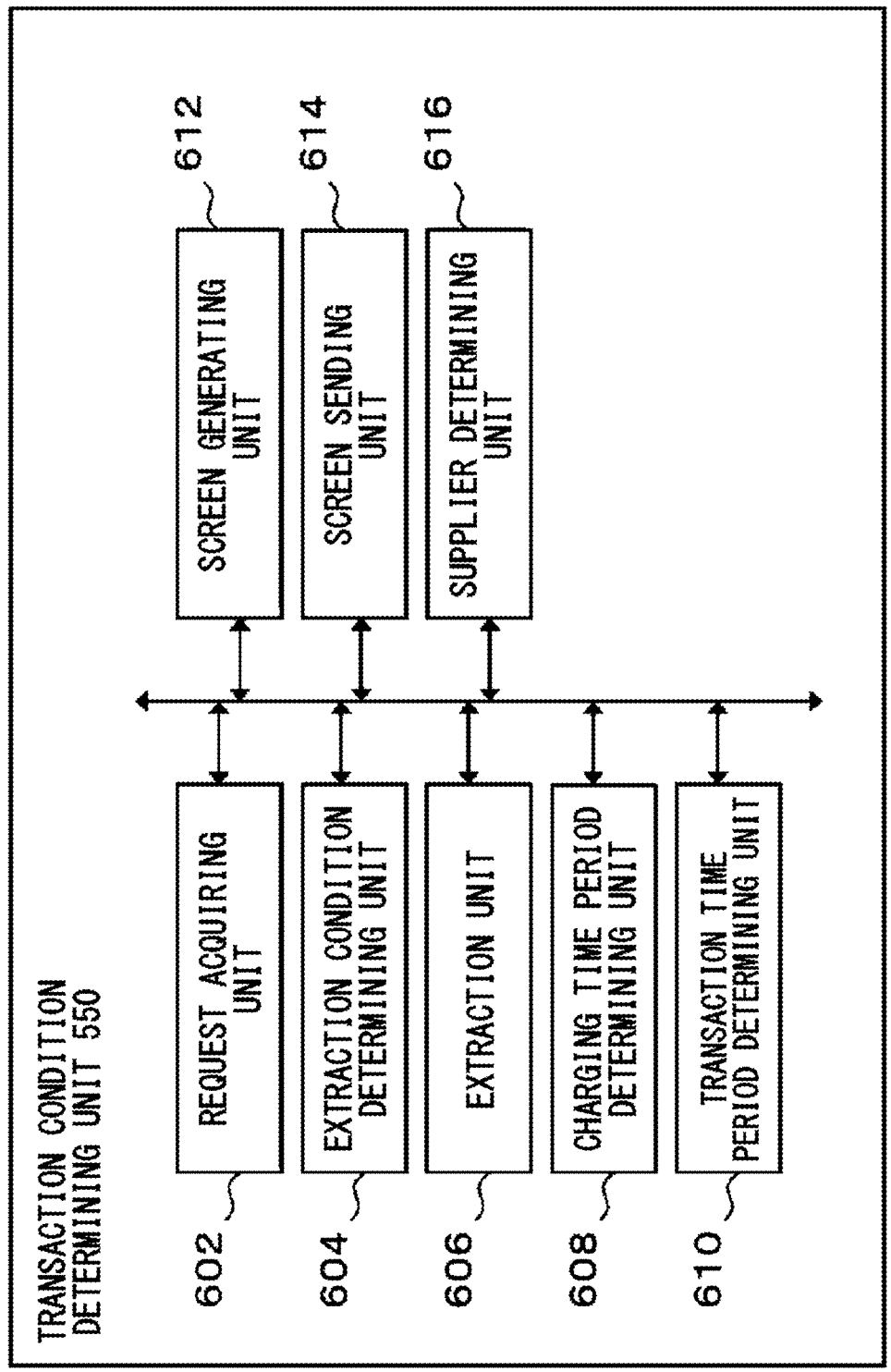
FIG. 9 schematically shows one example of an internal configuration of a transaction condition determining unit 550.

FIG. 9 schematically shows one example of an internal configuration of the transaction condition determining unit 550. In the present embodiment, the transaction condition determining unit 550 includes a request acquiring unit 602, an extraction condition determining unit 604, an extraction unit 606, a charging time period determining unit 608, a transaction time period determining unit 610, a screen generating unit 612, a screen sending unit 614, and a supplier determining unit 616.

The request acquiring unit 602 may be one example of the request amount acquiring unit and the user instruction acquiring unit. The extraction condition determining unit 604 may be one example of the request amount acquiring unit, the device location acquiring unit, the residual amount acquiring unit, the detecting unit, and the atmospheric temperature acquiring unit. The extraction unit 606 may be one example of the supply speed acquiring unit. The charging time period determining unit 608 may be one example of the supply time period determining unit. The transaction time period determining unit 610 may be one example of the completion time period determining unit. The screen generating unit 612 may be one example of the selection screen generating unit and the map screen generation unit. The screen sending unit 614 may be one example of the output controlling unit.

In the present embodiment, the request acquiring unit 602 acquires a request or an instruction related to the transaction of the consumable. The above-described request or instruction may be input by operating the communication terminal 120 or vehicle 22 by the demander 12. The request acquiring unit 602 may analyze the above-described request or instruction and transfer the request or instruction to another appropriate component. The request acquiring unit 602 may also transfer accessory information of the above-described request or instruction to the above-described other appropriate component.

One Example of Request

In one embodiment, the request acquiring unit 602 receives the extraction request for extracting the supply candidates from the communication terminal 120. The extraction request may include information related to at least one of a supply desiring time or period, location, electric power amount, and a standard or quality of electric power (for example, a power feeding speed or charging efficiency). The extraction request may be a request for extracting the supply candidates which can supply electric power of equal to or more than the electric power request amount at/in a specified time or period (referred to as a specified time period or merging time period in some cases) and in a specified location (referred to as a merging area in some cases). The specified location may be a specified point, or may be a specified geographic range (referred to as an area in some cases). The request acquiring unit 602 may also acquire information for calculating the electric power request amount accompanying the above-described request. The request acquiring unit 602 transfers the above-described request and the information accompanying the request to the extraction condition determining unit 604, for example.

The electric power request amount is determined based on, for example, a location of the demander 12. The location of the demander 12 may be a current location of the vehicle 22, or may be a current location of the communication terminal 120, or may be a specified location in a specified time period designated by the demander 12. The electric power request amount may be determined by, for example, the request generating unit 402 of the communication terminal 120. The electric power request amount may be determined by the extraction condition determining unit 604.

One Example of Instruction

In another embodiment, the request acquiring unit 602 receives, from the communication terminal 120, an instruction showing that the specified supply candidate is selected an the transaction counterparty. The above-described instruction may be including identification information of the supply candidate selected by the demander 12 as the transaction counterparty. The request acquiring unit 602 sends the above-described instruction to the supplier determining unit 616.

In the present embodiment, the extraction condition determining unit 604 receives the extraction request from the request acquiring unit 602, and determines a condition (referred to as an extraction condition in some cases) for extracting data according to the extraction request. The extraction condition may include (i) a condition for extracting a supply candidate which can supply electric power of equal to or more than the electric power request amount. The extraction condition may further include (ii) a condition for extracting a supply candidate which can exist in a specified location in a specified time period.

First Embodiment of Extraction Condition

If a condition related to the electric power request amount, a condition related to the merging time period, and a condition related to the merging area are designated in the extraction request, the extraction condition determining unit 604 determines the extraction condition as designated in the extraction request. After that, the extraction condition determining unit 604 sends the determined extraction condition to the extraction unit 606, and requests an extraction of data related to the supply candidate which matches the extraction condition.

In this case, the extraction condition determining unit 604 requests the identification information of the supply candidate and the information related to the power feeding speed or charging efficiency of the supply candidate as the data related to the supply candidate which matches the extraction condition. The extraction condition determining unit 604 may also further request information necessary for calculating a period from the merging until the beginning of the charging. As the information necessary for calculating the period from the merging until the beginning of the charging, a current location of the supplier 14 or the vehicle 24, a specification of the vehicle 24, a preparation time period, and the like may be exemplified.

Second Embodiment of Extraction Condition

If the condition related to the electric power request amount has not been designated in the extraction request, the extraction condition determining unit 604 first determines the electric power request amount based on the location of the vehicle 22. The electric power request amount is determined by a procedure described below, for example.

In one embodiment, if a merging area is designated according to the extraction request, the extraction condition determining unit 604 first refers to the demand-side information storing unit 522 to acquire the information related to the current location of the vehicle 22 and the information related to the battery residual amount of the vehicle 22. Next, the extraction condition determining unit 604 determines whether or not the vehicle 22 can arrive at the merging area based on a distance from the current location of the vehicle 22 to the merging area, an electric power amount consumption rate (referred to as electric utility consumption in some cases) of the vehicle 22, and the battery residual amount of the vehicle 22. If it is determined that the vehicle 22 cannot arrive at the merging area, the extraction condition determining unit 604 sends information showing the determination to the communication terminal 120 and ends the processing.

If it is determined that the vehicle 22 can arrive at the merging area, the extraction condition determining unit 604 calculates the electric power request amount based on (i) a distance from a merging area to a destination or the closest charging station or a specified supplier 14, and (ii) electric utility consumption of the vehicle 22. For example, the electric power request amount is calculated by dividing the distance described in (i) by the electric utility consumption described in (ii). The specified supplier 14 is, for example, a supplier 14 that the demander 12 often uses. The extraction condition determining unit 604 may also further consider path information of the vehicle 22, map information (it is preferable that the map information includes information related to a difference in height), and information related to weather conditions, such as an atmospheric temperature and a humidity in the periphery of the vehicle 22, to calculate the electric power request amount.

In another embodiment, if the merging area is not designated according to the extraction request, the extraction condition determining unit 604 refers to the demand-side information storing unit 522 to acquire the information related to the current location of the vehicle 22 and the information related to the battery residual amount of the vehicle 22. Next, the extraction condition determining unit 604 determines a usable electric power amount based on the battery residual amount of the vehicle 22. The usable electric power amount is calculated by subtracting a predetermined value from the battery residual amount. The predetermined value may be a value designated by the demander 12, or may be a value set based on the weather conditions such as the atmospheric temperature and the humidity in the periphery of the vehicle 22. For example, the predetermined value becomes larger as the atmospheric temperature of the vehicle 22 is much out of a set range.

The extraction condition determining unit 604 calculates a movable area of the vehicle 22 based on the above-described usable electric power amount and the electric utility consumption of the vehicle 22. The extraction condition determining unit 604 may also calculate a movable area of the vehicle 22 based on the above-described usable electric power amount, the electric utility consumption of the vehicle 22, and the path information and map information of the vehicle 22 (it is preferable that the map information includes information related to a difference in height). The extraction condition determining unit 604 sets an arbitrary area within the movable area of the vehicle 22 as the merging area. The extraction condition determining unit 604 may also consider the path information of the vehicle 22 or a location/locations of one or more suppliers 14 existing in the periphery to set the merging area.

The extraction condition determining unit 604 calculates the electric power request amount based on (i) a distance from the merging area to a destination or the closest charging station or a specified supplier 14, and (ii) the electric utility consumption of the vehicle 22. For example, the electric power request amount is calculated by dividing the distance described in (i) by the electric utility consumption described in (ii). The specified supplier 14 is a supplier 14 that the demander 12 often uses, for example.

Furthermore, in another embodiment, if the merging time period is not designated in the extraction request, the extraction condition determining unit 604 calculates an estimated time at which the vehicle 22 arrives at the merging area based on the current location of the vehicle 22, the distance to the merging area designated according to the extraction request, and the information related to the traffic law. The extraction condition determining unit 604 sets a period including the calculated estimated time as the merging time period. A length of the above-described period may be a predetermined value, or may be a value designated by the demander 12.

Once the electric power request amount is calculated, next, the extraction condition determining unit 604 determines the extraction condition based on the merging area or merging time period designated according to the extraction request, the merging area or merging time period set as described above, and the electric power request amount calculated as described above. Subsequently, the extraction condition determining unit 604 sends the determined extraction condition to the extraction unit 606 and requests the extraction of the data which matches the extraction condition. In this case, the extraction condition determining unit 604 requests the identification information of the supply candidate and the information related to the power feeding speed or charging efficiency of the supply candidate as the data related to the supply candidate which matches the extraction condition. The extraction condition determining unit 604 may also further request information necessary for calculating a period from a time at which the transaction is established to a time at which the charging is started.

Third Embodiment of Extraction Condition

In the present embodiment, the extraction condition determining unit 604 acquires the information related to the battery residual amount of the vehicle 22 to determine whether or not the battery residual amount of the vehicle 22 is smaller than a predetermined value. If it is determined that the battery residual amount of the vehicle 22 is smaller than the predetermined value, the extraction condition determining unit 604 calculates the electric power request amount based on (i) the distance from the current location of the vehicle 22 to the destination or the closest charging station or the specified supplier 14, and (ii) the electric utility consumption of the vehicle 22. For example, the electric power request amount is calculated by dividing the distance described in (i) by the electric utility consumption described in (ii). The specified supplier 14 is the supplier 14 that the demander 12 often uses, for example.

The predetermined value may be a value designated by the demander 12, or may be a value set based on the and the weather conditions such as the atmospheric temperature and the humidity in the periphery of the vehicle 22. For example, the predetermined value becomes larger as the atmospheric temperature of the vehicle 22 is much out of the set range. Also, the extraction condition determining unit 604 may also further consider the path information of the vehicle 22, the map information (it is preferable that the map information includes the information related to the difference in height), and the information related to the weather conditions, such as the atmospheric temperature and humidity in the periphery of the vehicle 22, to calculate the electric power request amount.

Next, the extraction condition determining unit 604 sets the current location of the vehicle 22 as the merging area and generates the extraction condition for extracting, from among one or more supply candidates which can supply the electric power request amount calculated as described above, the supply candidate by which a period from a time at which the transaction is established to a time at which the charging is started is shorter than a predetermined period. The extraction condition determining unit 604 requests the identification information of the supply candidate and the information necessary for calculating the period from the time at which the transaction is established to the time at which the charging is started, as the data related to the supply candidate which matches the extraction condition.

In the present embodiment, the extraction unit 606 refers to the storage unit 520 and extracts the information which matches the extraction condition determined by the extraction condition determining unit 604 from the information having been stored in the storage unit 520. In one embodiment, the extraction unit 606 extracts the identification information of the supply candidate and the information related to the power feeding speed or charging efficiency of the supply candidate with respect to each of one or more supply candidates matching the extraction condition determined by the extraction condition determining unit 604. The extraction unit 606 may also further extract the information necessary for calculating the period from the time at which the transaction is established to the time at which the charging is started. The extraction unit 606 may send the extracted information to the charging time period determining unit 608 or the transaction time period determining unit 610.

In another embodiment, the extraction unit 606 extracts the identification information of the supply candidate and the information necessary for calculating the period from the time at which the transaction is established to the time at which the charging is started with respect to each of the one or more supply candidates matching the extraction condition determined by the extraction condition determining unit 604. The extraction unit 606 may send the extracted information to at least one of the screen generating unit 612 and the supplier determining unit 616.

In the present embodiment, the charging time period determining unit 608 receives the information related to the electric power request amount from the extraction condition determining unit 604. Also, the charging time period determining unit 608 receives, from the extraction unit 606, the identification information of the supply candidate and the information related to the power feeding speed or charging efficiency of the supply candidate with respect to each of the one or more supply candidates matching the above-described extraction condition.

The charging time period determining unit 608 determines a period (referred to as a charging time period in some cases) from a time at which the charging is started by the supply candidate to a time at which the electricity corresponding to the electric power request amount is charged based on the information received from the extraction condition determining unit 604 and the extraction unit 606. For example, the charging time period determining unit 608 calculates the charging time period by dividing the electric power request amount by the power feeding speed or the charging efficiency. The charging time period determining unit 608 may send the information related to the charging time period to at least one of the screen generating unit 612 and the supplier determining unit 616.

In the present embodiment, the transaction time period determining unit 610 receives the information related to the electric power request amount from the extraction condition determining unit 604. Also, the transaction time period determining unit 610 receives, from the extraction unit 606, the identification information of the supply candidate, the information related to the power feeding speed or charging efficiency of the supply candidate, and the information necessary for calculating the period from the time at which the transaction is established to the time at which the charging is started with respect to each of the one or more supply candidates matching the above-described extraction condition. Further, the transaction time period determining unit 610 receives information related to the charging time period.

The transaction time period determining unit 610 determines the transaction time period based on the information received from the extraction condition determining unit 604, the extraction unit 606, and the charging time period determining unit 608. The transaction time period includes (i) the period from the time at which the transaction is established to the time at which the charging is started and (ii) the charging time period determined by the charging time period determining unit 608.

The transaction time period may also include (i) the period from the time at which the transaction is established to the time at which the charging is started, (ii) a charging time period determined by the charging time period determining unit 608, and (iii) a period for checking the implementation of the transaction after the charging is completed. The transaction time period may be calculated as a sum of (i) the period from the time at which the transaction is established to the time at which the charging is started and (ii) the charging time period determined by the charging time period determining unit 608. The transaction time period determining unit 610 may send the information related to the transaction time period to at least one of the screen generating unit 612 and the supplier determining unit 616.

In the present embodiment, the screen generating unit 612 generates a screen which is to be displayed on a display unit of the communication terminal 120. The screen generating unit 612 may also generate a screen which displays the extraction result. The screen which displays the extraction result may be a screen for urging the demander 12 to select one supplier 14 or vehicle 24 as the transaction counterparty from among the extracted one or more supply candidates. The extraction result may be displayed in various display formations. In one embodiment, the extraction result is displayed in a list formation. In another embodiment, the extraction result is displayed on a map.

In one embodiment, the above-described screen may be a screen showing the candidate identification information for identifying each supply candidate and the charging time period determined by the charging time period determining unit 608 which are corresponded to each other with respect to each of the supply candidates which can supply the electricity corresponding to the electric power request amount. In another embodiment, the screen may be a screen showing the candidate identification information for identifying each supply candidate and the transaction time period determined by the transaction time period determining unit 610 which are corresponded to each other with respect to each of the supply candidates which can supply the electricity corresponding to the electric power request amount.

In the present embodiment, the screen generating unit 612 may also generate a map screen on which one or more icons showing a location of each of at least part of the supply candidates are displayed on the map. For example, the screen generating unit 612 cooperates with the extraction condition determining unit 604, the extraction unit 606, and the supply-side information storing unit 524 to extract one or more supply candidates located on the map displayed on the screen.

Also, the screen generating unit 612 refers to the supply-side information storing unit 524 and acquires the information related to each of the extracted supply candidates. For example, the screen generating unit 612 acquires the information showing at least one of the power feeding speed or charging efficiency, the suppliable time period, the suppliable area, the suppliable amount, the standard, the quality, and the price.

The screen generating unit 612 may determine at least one of the shape, the pattern, the color, and the size of one or more icons based on the power feeding speed or charging efficiency of the supply candidate(s) corresponding to the icon(s). The screen generating unit 612 may also generate the screen on which the information showing at least one of the suppliable time period, the suppliable area, the suppliable amount, the standard, the quality, and the price is further displayed.

In the present embodiment, the screen sending unit 614 sends the screen generated by the screen generating unit 612 to the vehicle 22 or the communication terminal 120. Accordingly, the screen generated by the screen generating unit 612 may be output by the output unit 308 of the vehicle 22 or the output unit 408 of the communication terminal 120.

In the present embodiment, the supplier determining unit 616 determines the supplier 14 or vehicle 24 to be the transaction counterparty from among the one or more supply candidates. In one embodiment, the supplier determining unit 616 determines the supplier 14 or vehicle 24 to be the transaction counterparty based on the charging time period determined by the charging time period determining unit 608. In another embodiment, the supplier determining unit 616 determines the supplier 14 or the vehicle 24 to be the transaction counterparty based on the transaction time period determined by the transaction time period determining unit 610. Further, in another embodiment, if it is detected that the battery residual amount of the vehicle 22 is smaller than a predetermined value, the supplier determining unit 616 determines the supplier 14 or vehicle 24 to be the transaction counterparty based on the period from the time at which that the transaction is established to the time at which the charging is started.

The supplier determining unit 616 may also determine the supplier 14 or vehicle 24 to be the transaction counterparty based on the instruction from the demander 12, or may determine the supplier 14 or vehicle 24 to be the transaction counterparty based on a predetermined condition. For example, the supplier determining unit 616 determines the supplier 14 or vehicle 24 to be the transaction counterparty based on the identification information of the supply candidate shown by the user instruction received by the request acquiring unit 602.

FIG. 10 schematically shows one example of a data table 700. The data table 700 may be one example of the information related to the demander 12 or vehicle 22. The data table 700 is stored in the demand-side information storing unit 522, for example. In the present embodiment, the data table 700 makes a demander ID 702, an address 704, a current location 706, an outside atmospheric temperature 708, a battery residual amount 710, device characteristics 712, and personal information 714 be corresponded to each other, and stores them.

As the device characteristics 712, the specification of the vehicle 22, the rated value of the performance of the vehicle 22, the actual value of the performance of the vehicle 22, and the like may be exemplified. The actual value of the performance of the vehicle 22 is determined based on the measurement values measured by various sensors mounted on the vehicle 22, for example. The data table 700 may also store other information related to the demander 12 or vehicle 22.

FIG. 11 schematically shows one example of a data table 800. The data table 800 may be one example of the request sent from the vehicle 22 or communication terminal 120 to the management server 110. In the present embodiment, the data table 800 includes a request ID 802, a demander ID 804, and request contents 806. As the request contents 806, the condition related to the electric power request amount, the condition related to the merging time period, and the condition related to the merging area, and the like may be exemplified.

FIG. 12 schematically shows one example of a data table 900. The data table 900 may be one example of the information related to the supplier 14 or vehicle 24. The data table 900 is stores in the supply-side information storing unit 524, for example. In the present embodiment, the data table 900 makes a supply candidate ID 902, an address 904, a current location 906, a basic condition 908, a condition negotiation 910, a status 912 related to a bid, and personal information 914 be corresponded to each other, and stores them.

As the basic condition 908, a suppliable time period of the consumable, a suppliable area of the consumable, a suppliable amount of the consumable, a standard or quality of the suppliable consumable, a price of the consumable, a settlement method, and the like may be exemplified. The condition negotiation 910 shows a propriety of a negotiation related to conditions described in the basic condition 908. The status 912 related to a bid shows whether or not any response can be currently made to the tender. The data table 900 may also store other information related to the supplier 14 or vehicle 24.

Figure 13:
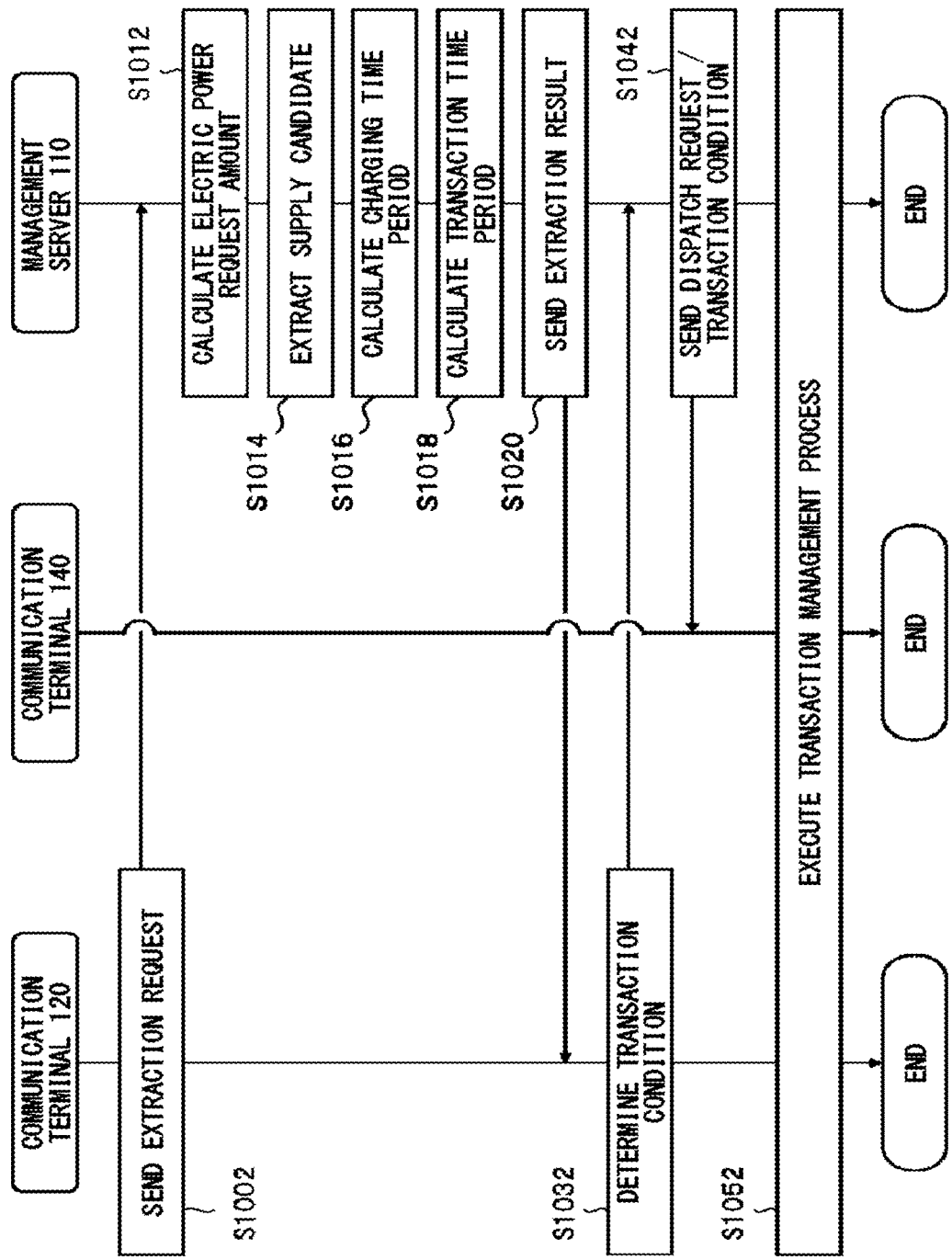
FIG. 13 schematically shows one example of information processing according to the transaction management system 100.

FIG. 13 schematically shows one example of information processing according to the transaction management system 100. According to the present embodiment, first, in a step 1002 ("step" may be abbreviated to "S"), the request generating unit 402 of the communication terminal 120 generates an extraction request. Also, the request generating unit 402 sends the generated extraction request to the management server 110.

Next, in an S1012, the request acquiring unit 602 of the management server 110 received the extraction request. The request acquiring unit 602 analyzes the extraction request and determines the presence or absence of the information showing an electric power request amount. If the information showing the electric power request amount is included in the extraction request, the request acquiring unit 602 sends the extraction request to the extraction condition determining unit 604. If the information showing the electric power request amount is not included in the extraction request, the request acquiring unit 602 collects information for calculating the electric power request amount. Subsequently, the request acquiring unit 602 sends the extraction request and the information for calculating the electric power request amount to the extraction condition determining unit 604. The extraction condition determining unit 604 determines the electric power request amount based on the information received from the request acquiring unit 602.

Next, in an S1014, the extraction condition determining unit 604 generates the extraction condition according to the extraction request. The extraction condition determining unit 604 sends the generated extraction condition to the extraction unit 606. The extraction unit 606 refers to the supply-side information storing unit 524 and extracts one or more supply candidates matching the extraction condition. Also, the extraction unit 606 extracts the identification information of the supply candidate, the information related to the power feeding speed or charging efficiency of the supply candidate, and the information necessary for calculating the period from the time at which the transaction is established to the time at which that the charging is started with respect to each of the one or more supply candidates.

Next, in an S1016, the charging time period determining unit 608 calculates the charging time period with respect to each of the one or more supply candidates. Also, in an S1018, the transaction time period determining unit 610 calculates the transaction time period with respect to each of the one or more supply candidates. Subsequently, in an S1020, the screen generating unit 612 generates a screen for displaying the extraction result. Also, the screen sending unit 614 sends the generated screen to the communication terminal 120.

Next, in an S1032, the communication terminal 120 receives the information of the screen generated by the screen generating unit 612. The communication terminal 120 displays the above-described screen on the output unit 308. In the S1032, the demander 12 views the screen displayed on the output unit 308 of the communication terminal 120 to determine the supplier 14 to be the transaction counterparty. The demander 12 operates the communication terminal 120 and sends, to the management server 110, the instruction showing that one of the supply candidates is selected as the transaction counterparty.

Next, in an S1042, the request acquiring unit 602 of the management server 110 receives an instruction from the communication terminal 120 and transfers the instruction to the supplier determining unit 616. The supplier determining unit 616 determines, as the transaction counterparty, the supply candidate selected by the demander 12 as the transaction counterparty. The supplier determining unit 616 also determines other transaction conditions. The supplier determining unit 616 sends, to the communication terminal 140 of the supplier 14 selected as the transaction counterparty, the information, which shows that the transaction is established, and the transaction conditions to demand a dispatch. After that, in an S1052, according to the transaction management unit 560 of the management server 110, a transaction management process is executed.

Figure 14:
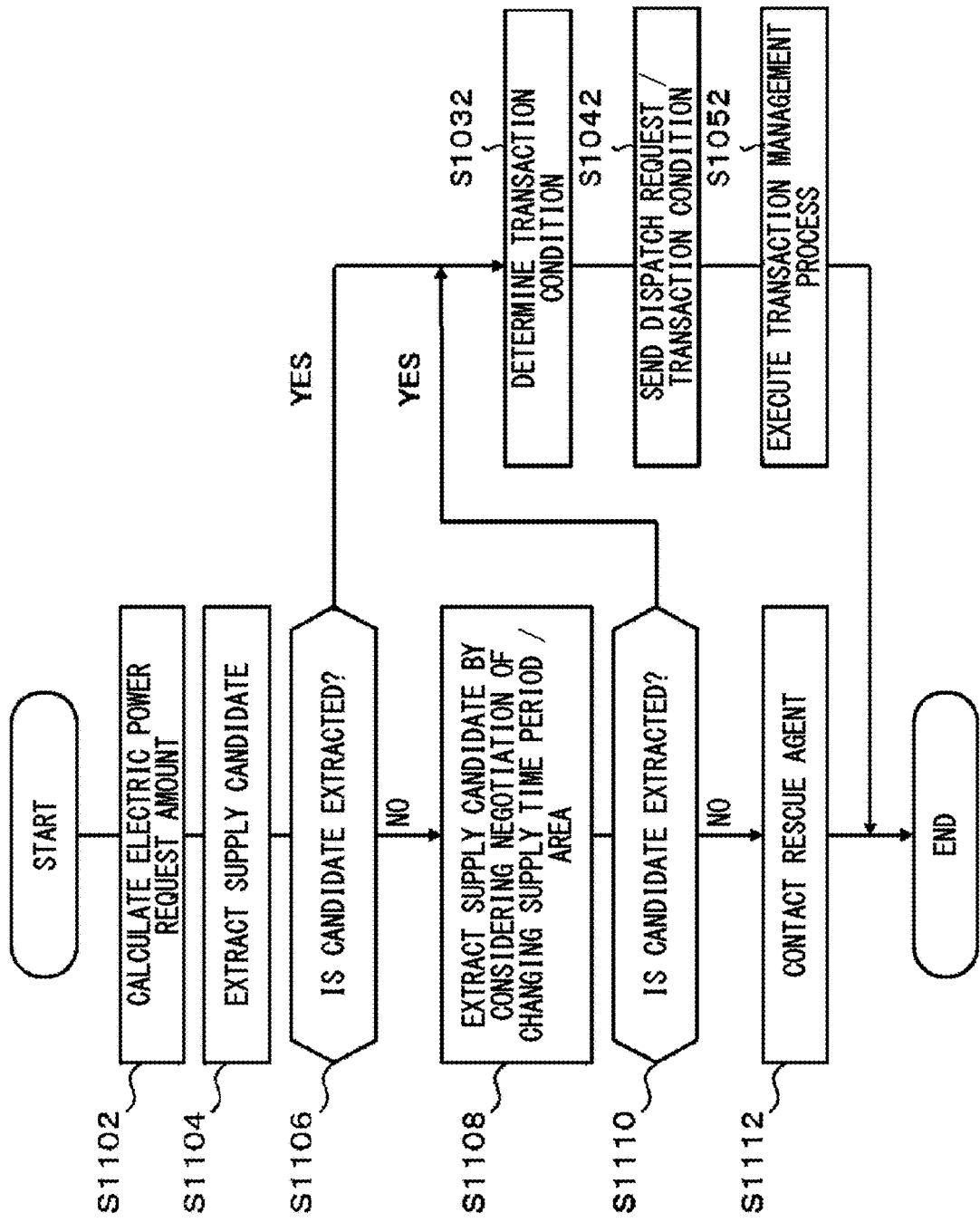
FIG. 14 schematically shows one example of information processing according to the transaction management system 100.

FIG. 14 schematically shows one example of the information processing according to the transaction management system 100. The present embodiment may be one example of the information processing in a case where it is detected that the battery residual amount of the vehicle 22 is smaller than the predetermined value.

According to the present embodiment, first, in an S1102, the extraction condition determining unit 604 detects that the battery residual amount of the vehicle 22 is smaller than the predetermined value. In this case, the extraction condition determining unit 604 calculates the electric power request amount based on (i) a distance from the current location of the vehicle 22 to the destination or the closest charging station or the specified supplier 14 and (ii) the electric utility consumption of the vehicle 22.

Next, in an S1104, the extraction condition determining unit 604 sets the current location of the vehicle 22 as the merging area, and generates the extraction condition for extracting the supply candidates by which a period from the time at which the transaction is established to the time at which the charging is started is shorter than the predetermined period from among the one or more supply candidates which can supply the electric power request amount calculated in the S1102. The extraction condition determining unit 604 sends the generated extraction condition to the extraction unit 606. The extraction unit 606 refers to the storage unit 520 and extracts the information matching the extraction condition determined by the extraction condition determining unit 604 from among the information stored in the storage unit 520.

In an S1104, if at least one supply candidate is extracted (the case of YES in an S1106), the processing similar to that of the S1032, S1042, and S1052 described with reference to FIG. 13 is to be executed. On the other hand, if no supply candidate is extracted in the S1104 (the case of NO in the S1106), in an S1108, the extraction unit 606 considers a negotiation of changing the supply time period and the supply area, and once again extracts the information matching the extraction condition determined by the extraction condition determining unit 604.

In the S1108, if at least one supply candidate is extracted (the case of YES in an S1110), the processing similar to that of the S1032, S1042, S1052 described with reference to FIG. 13 is to be executed. On the other hand, in the S1108, if no supply candidate is extracted (the case of NO in the S1110), in an S1112, the transaction condition determining unit 550 contacts a rescue supplier about the location information of the vehicle 22 and the like to demand a help.

Figure 15:
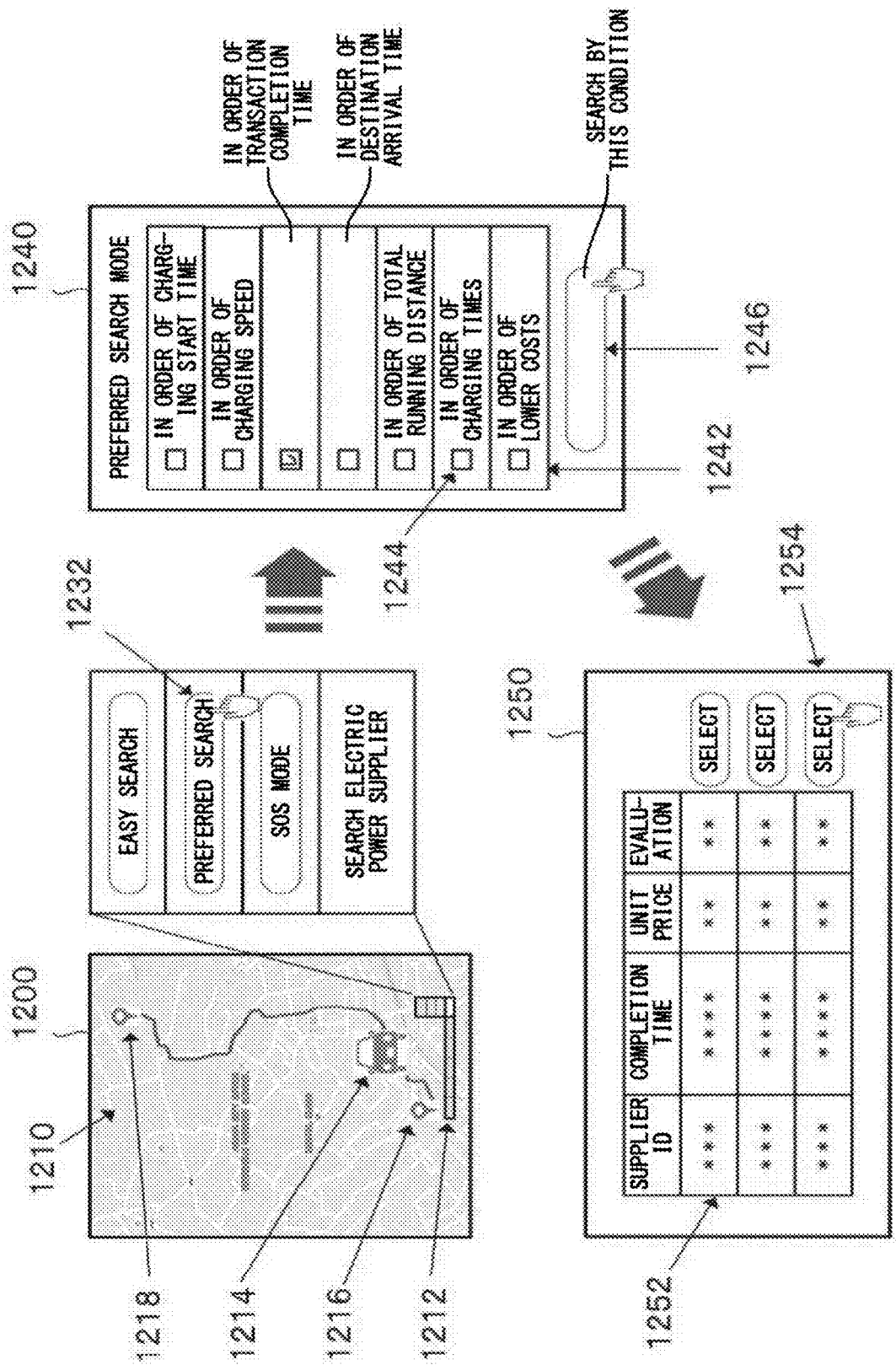
FIG. 15 schematically shows one example of a screen transition.

FIG. 15 schematically shows one example of a screen transition. One example of the screen transition among a navigation screen 1200, a menu screen 1240, and a result display screen 1250 will be described using FIG. 15. In the present embodiment, the navigation screen 1200 includes a map object 1210, an operation menu object 1212, an automobile object 1214, a departure point object 1216, and a destination point object 1218.

The operation menu object 1212 includes a plurality of button objects, for example. As a user (for example, the demander 12 or supplier 14) selects each button object on the navigation screen 1200, an operation associated with each button object is executed. For example, once a button object 1232 included in the operation menu object 1212 is clicked, the screen is transited and the menu screen 1240 is displayed.

The menu screen 1240 is a screen for executing the extraction operation based on, for example, a complicated extraction condition. In the present embodiment, the menu screen 1240 includes a list object 1242 for displaying a plurality of extraction conditions in a tabular, a check box object 1244 for selecting the extraction condition, and a button object 1246 for executing the extraction operation based on the selected extraction condition. After the user selects an arbitrary extraction condition, as the user clicks the button object 1246, the screen is transited and the result display screen 1250 is displayed.

The result display screen 1250 is a screen for displaying the extraction result, for example. In the present embodiment, the result display screen 1250 includes a list object 1252 for displaying the extraction result in a tabular and a button object 1254 for designating the supply candidate selected as the transaction counterparty. As the user clicks the button object 1246 corresponding to an arbitrary supply candidate, a user instruction showing that the supply candidate is selected as the transaction counterparty is sent to the management server 110.

Figure 16:
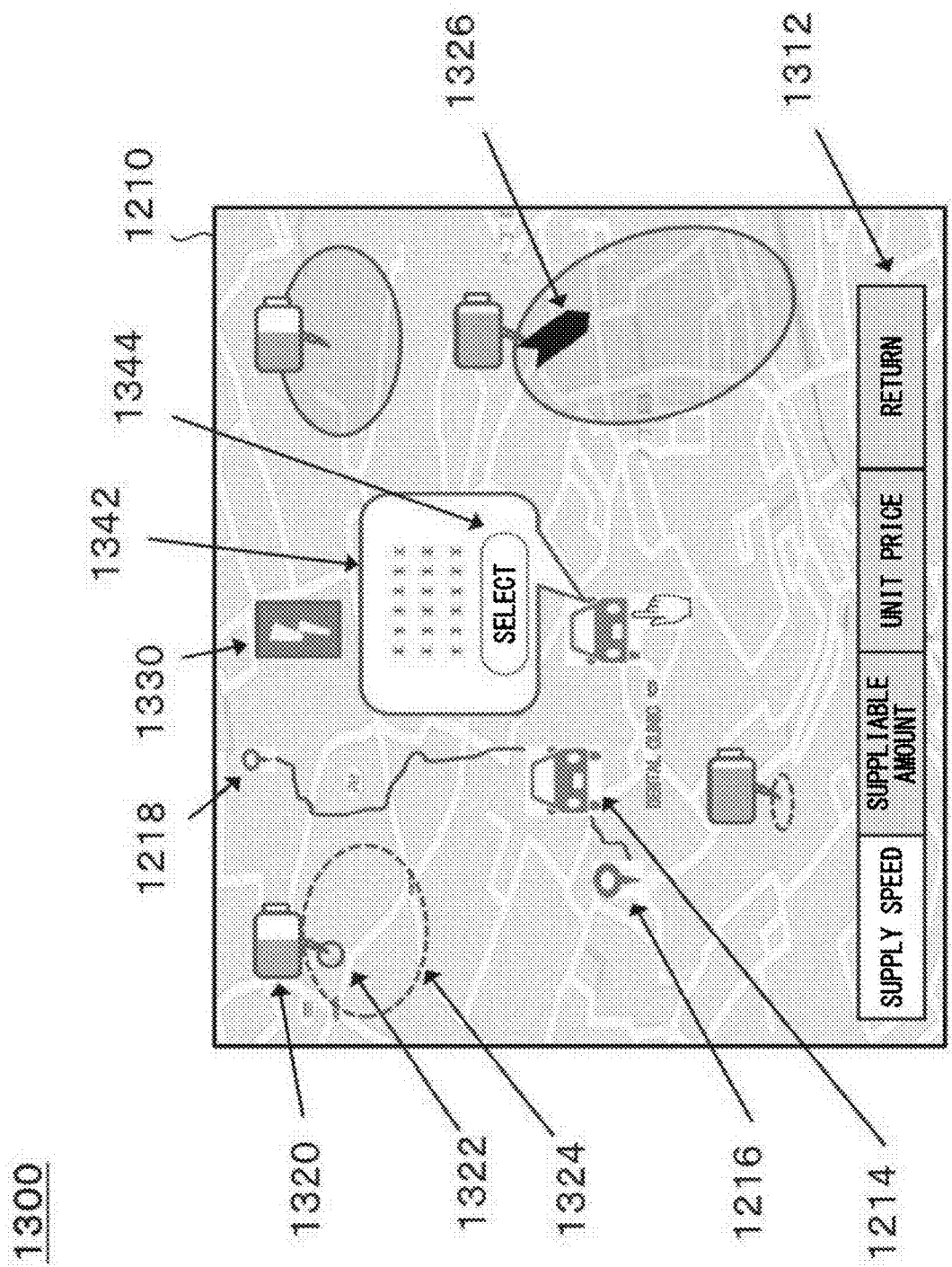
FIG. 16 schematically shows one example of a screen 1300.

FIG. 16 schematically shows one example of a screen 1300. The screen 1300 may be one example of the screen on which the supply candidate located within the display area is arranged on the map. The screen 1300 may be one embodiment of the screen displaying the extraction result. In the present embodiment, the result display screen 1300 includes a map object 1210, an automobile object 1214, a departure point object 1216, a destination point object 1218, an operation menu object 1312, a supply apparatus object 1320, a supply area object 1322, a negotiable area object 1324, a direction instruction object 1326, a charging station object 1330, a detail display object 1342, and a button object 1344.

In the present embodiment, the operation menu object 1312 includes a plurality of button objects for switching the contents of the information displayed by the icons showing each of the one or more supply candidates. For example, as the user clicks any of the button objects described as "supply speed", at least one of the shape, the pattern, the color, and the size of the icon of each supply candidate changes to that of an icon determined based on the "supply speed" of each supply candidate. The button objects described as "suppliable amount" or "unit price" are similar to the above. Also, as the user clicks a button object described as "return", the screen can be transited to return to the navigation screen 1200.

In the present embodiment, the supply apparatus object 1320 is the icon showing each supply candidate, and shows a current location of the supply candidate. The supply area object 1322 shows a suppliable area which is in accordance with each supply candidate. The negotiable area object 1324 shows the suppliable area in a case where the supply candidate responded to the negotiation of changing the suppliable area. The direction instruction object 1326 shows a travelling direction of the supply candidate in a case where the supply candidate is movable and is moving actually. The charging station object 1330 may be an icon showing the location of the charging station.

In the present embodiment, as the user clicks the supply apparatus object 1320, the detail display object 1342 and the button object 1344 are displayed. The detail display object 1342 presents detailed information of the supply candidate corresponding to the clicked supply apparatus object 1320.

The button object 1344 is an object for selecting the supply candidate corresponding to the clicked supply apparatus object 1320 as the transaction counterparty. As the user clicks the button object 1344, the user instruction showing that the corresponding supply candidate is selected as the transaction counterparty is sent to the management server 110.

Figure 17:
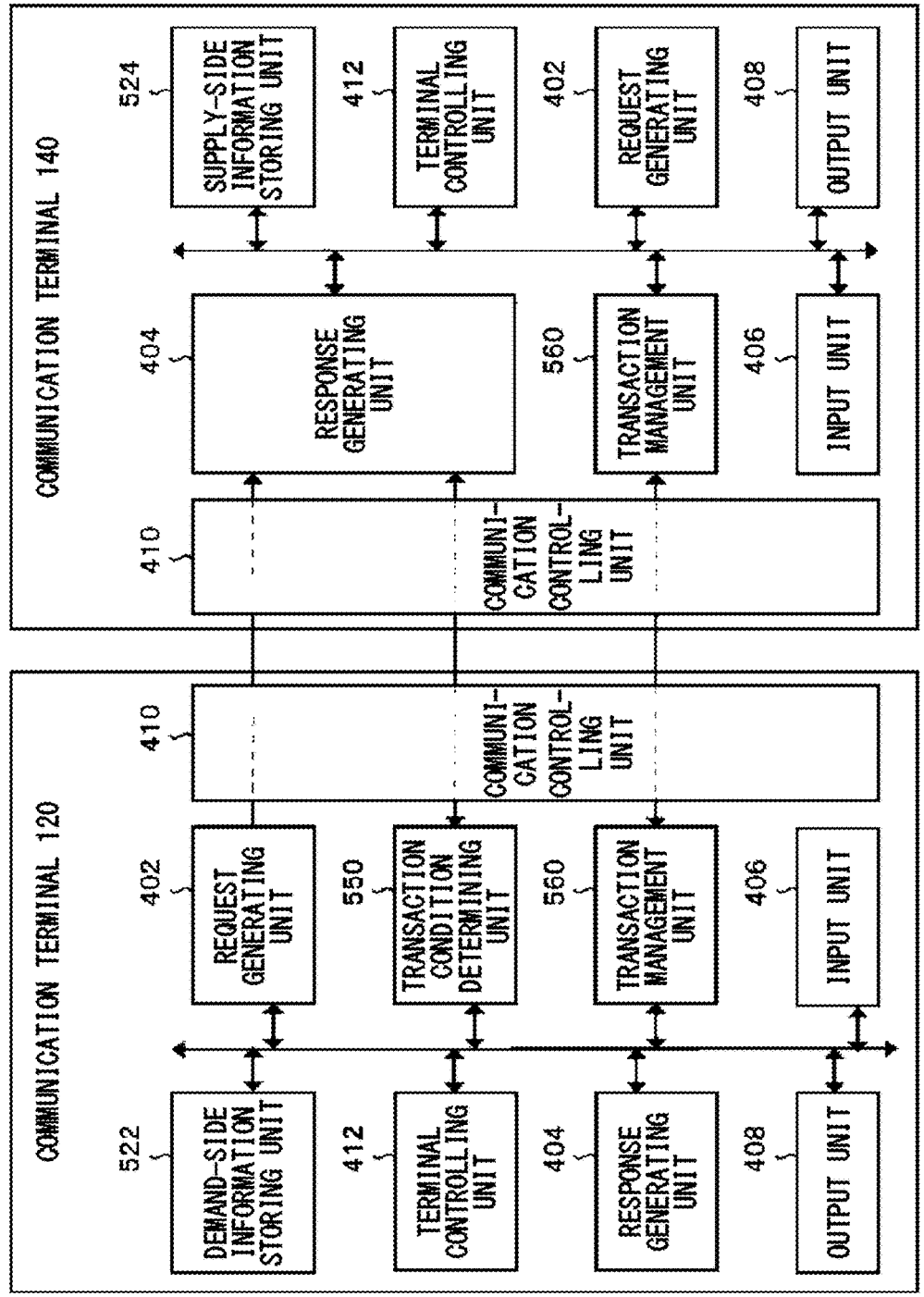
FIG. 17 schematically shows one example of a system configuration of a transaction management system 1400.

FIG. 17 schematically shows one example of a system configuration of a transaction management system 1400. In the present embodiment, the transaction management system 1400 includes a communication terminal 120 and a communication terminal 140. The transaction management system 1400 is different from the transaction management system 100 in the point that the communication terminal 120 has a transaction condition determining unit 550, and the communication terminal 120 and the communication terminal 140 establish the transaction in the P2P manner. Note that the management server 110 may be used also for relaying the communication between the communication terminal 120 and the communication terminal 140.

Regarding points other than the above-described different point, the transaction management system 1400 may also have a configuration similar to that of the transaction management system 100. Unless a technical contradiction occurs, the transaction management system 1400 or each unit thereof may have the configuration similar to at least one of the information processing apparatus 40, the information processing apparatus 60, and the information processing apparatus 70 described with reference to FIG. 1 to FIG. 3 or each unit thereof.

According to the present embodiment, the communication terminal 120 includes a request generating unit 402, a response generating unit 404, an input unit 406, an output unit 408, a communication controlling unit 410, a terminal controlling unit 412, a demand-side information storing unit 522, a transaction condition determining unit 550, and a transaction management unit 560. Similarly, the communication terminal 140 includes the request generating unit 402, the response generating unit 404, the input unit 406, the output unit 408, the communication controlling unit 410, the terminal controlling unit 412, a supply-side information storing unit 524, and the transaction management unit 560.

Figure 18:
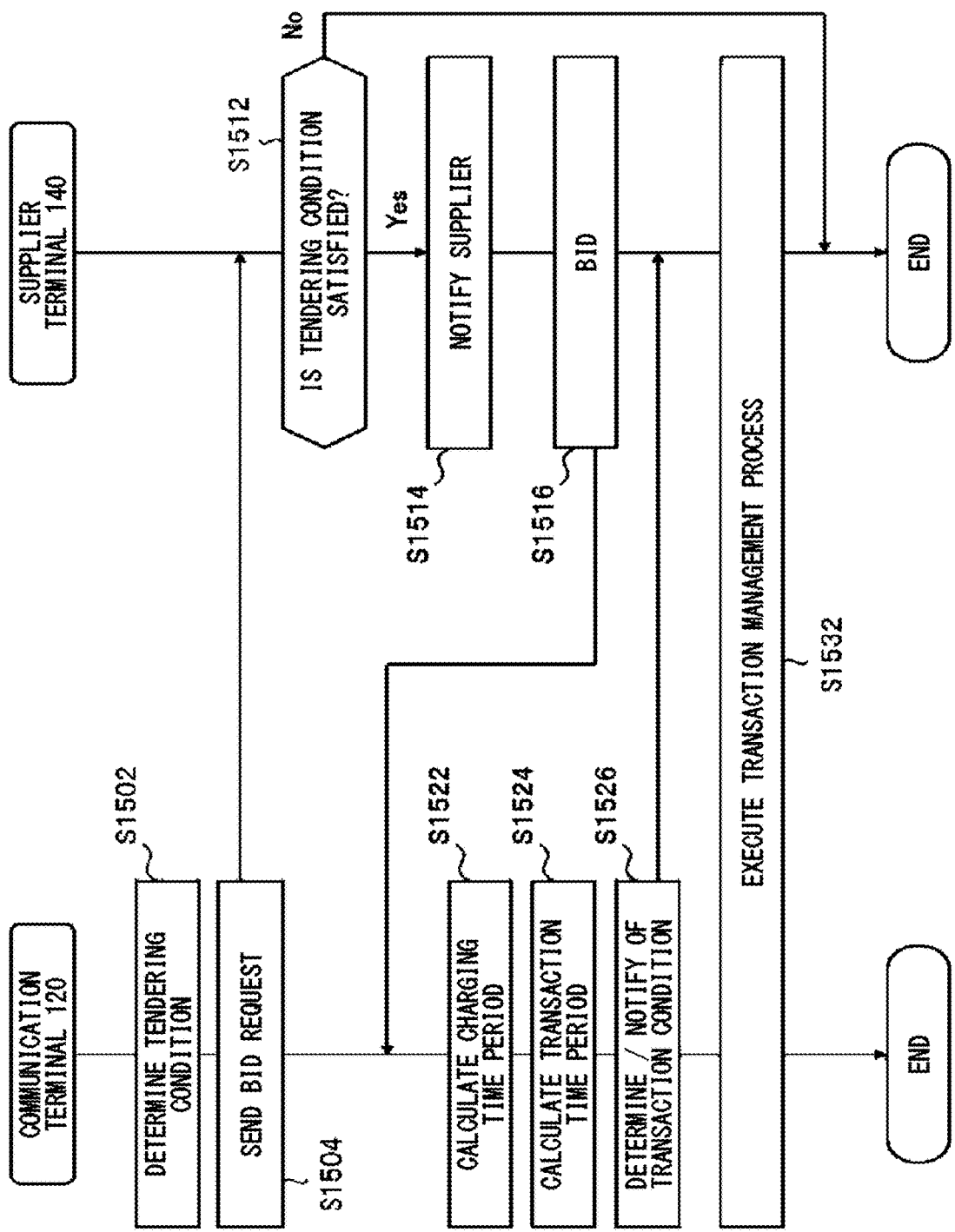
FIG. 18 schematically shows one example of information processing according to the transaction management system 1400.

FIG. 18 schematically shows one example of information processing according to the transaction management system 1400. According to the present embodiment, first, in an S1502, the request generating unit 402 of the communication terminal 120 determines a tendering condition. The tendering condition may include the condition related to the electric power request amount. The tendering condition may also include conditions related to at least one of the electric power request amount, the merging time period, and the merging area. Next, in an S1504, the request generating unit 402 sends the tendering condition determined in the S1502 to the communication terminal 140 to request for a response to the tender. Also, at the time of bidding, a request for a response regarding information such as the price and the power feeding speed or charging efficiency is made. The request generating unit 402 may deliver the tendering condition and the like by sending simultaneously, or may simultaneously send the tendering condition and the like to the communication terminal 140 existing in a constant area.

Next, in an S1512, the response generating unit 404 of the communication terminal 140 analyzes the tendering condition from the communication terminal 120 to determine whether or not the supplier 14 or vehicle 24 corresponding to the communication terminal 140 satisfies the tendering condition. If the supplier 14 or vehicle 24 does not satisfy the tendering condition (the case of No in the S1512), the communication terminal 140 ends the processing. On the other hand, if the supplier 14 or the vehicle 24 satisfies the tendering condition (the case of YES in the S1512), in an S1514, the response generating unit 404 notifies the supplier 14, by using the output unit 408, of that the bid request is received. After that, in an S1516, the response generating unit 404 executes the bidding processing based on an instruction of the supplier 14. For example, the response generating unit 404 sends the information related to the price of the electric power to be supplied, the power feeding speed or charging efficiency, and the like to the communication terminal 120.

Next, in an S1522, the transaction condition determining unit 550 of the communication terminal 120 receives the bidding information from the one or more communication terminals 140. The transaction condition determining unit 550 calculates the charging time period according to the procedure similar to S1016 described with reference to FIG. 13. In an S1524, the transaction condition determining unit 550 calculates the transaction time period according to the procedure similar to S1018.

In an S1526, the transaction condition determining unit 550 determines the transaction condition according to the procedure similar to S1032. The transaction condition determining unit 550 sends the transaction condition to the communication terminal 140 of the supplier 14 selected as the transaction counterparty to demand the dispatch. Subsequently, in an S1532, according to the procedure similar to the S1052, the transaction management unit 560 of the communication terminal 120 and the transaction management unit 560 of the communication terminal 140 execute the transaction management process.

Figure 19:
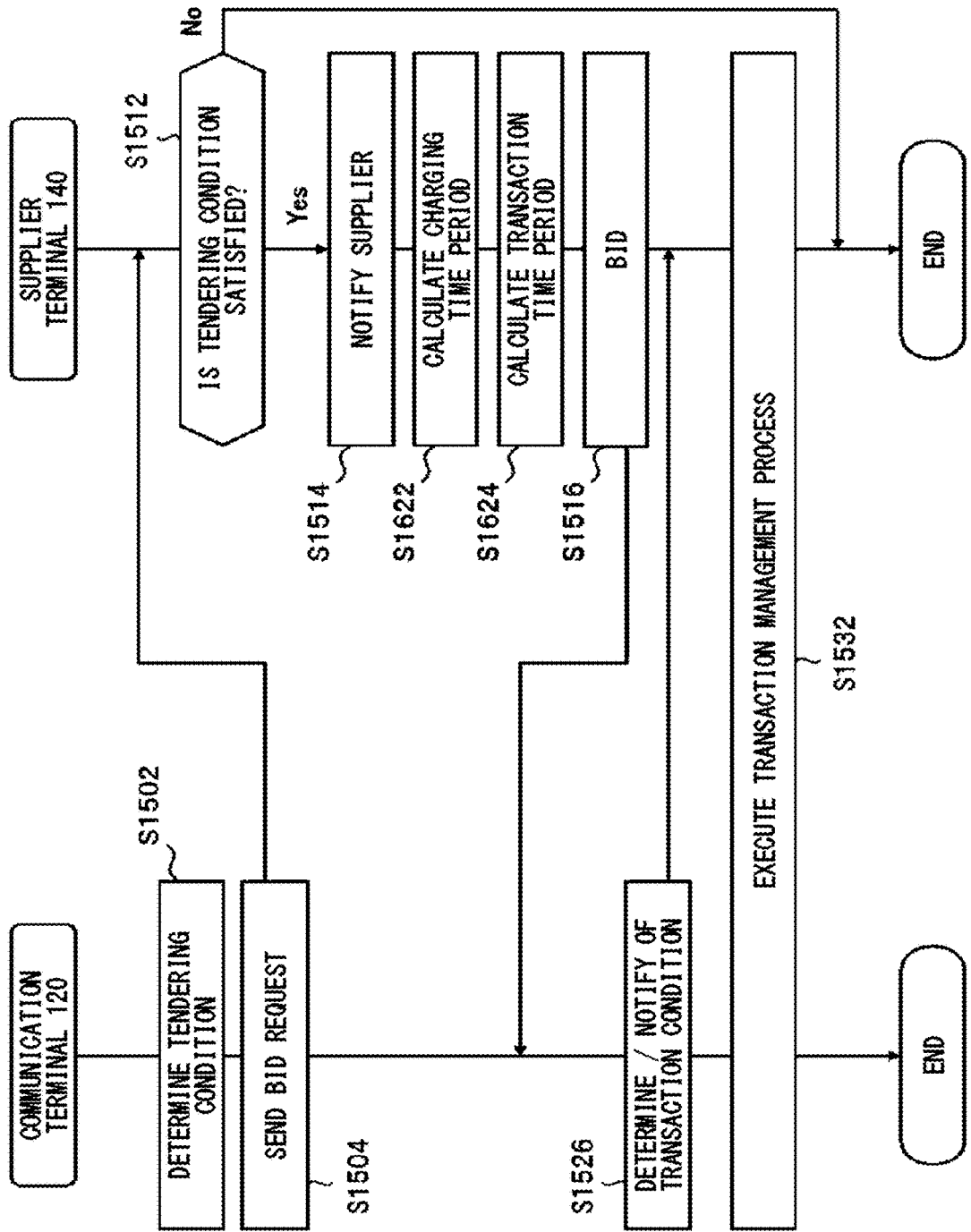
FIG. 19 schematically shows one example of information processing according to the transaction management system 1400.

FIG. 19 schematically shows one example of the information processing according to the transaction management system 1400. The present embodiment is different from the information processing of FIG. 18 in the point that the S1522 and S1524 described with reference to FIG. 18 (both are represented as an S1622 and S1624 in FIG. 19) are respectively executed in the communication terminal 140. Regarding other points, the present embodiment may have the configuration similar to the information processing of FIG. 18.

Figure 20:
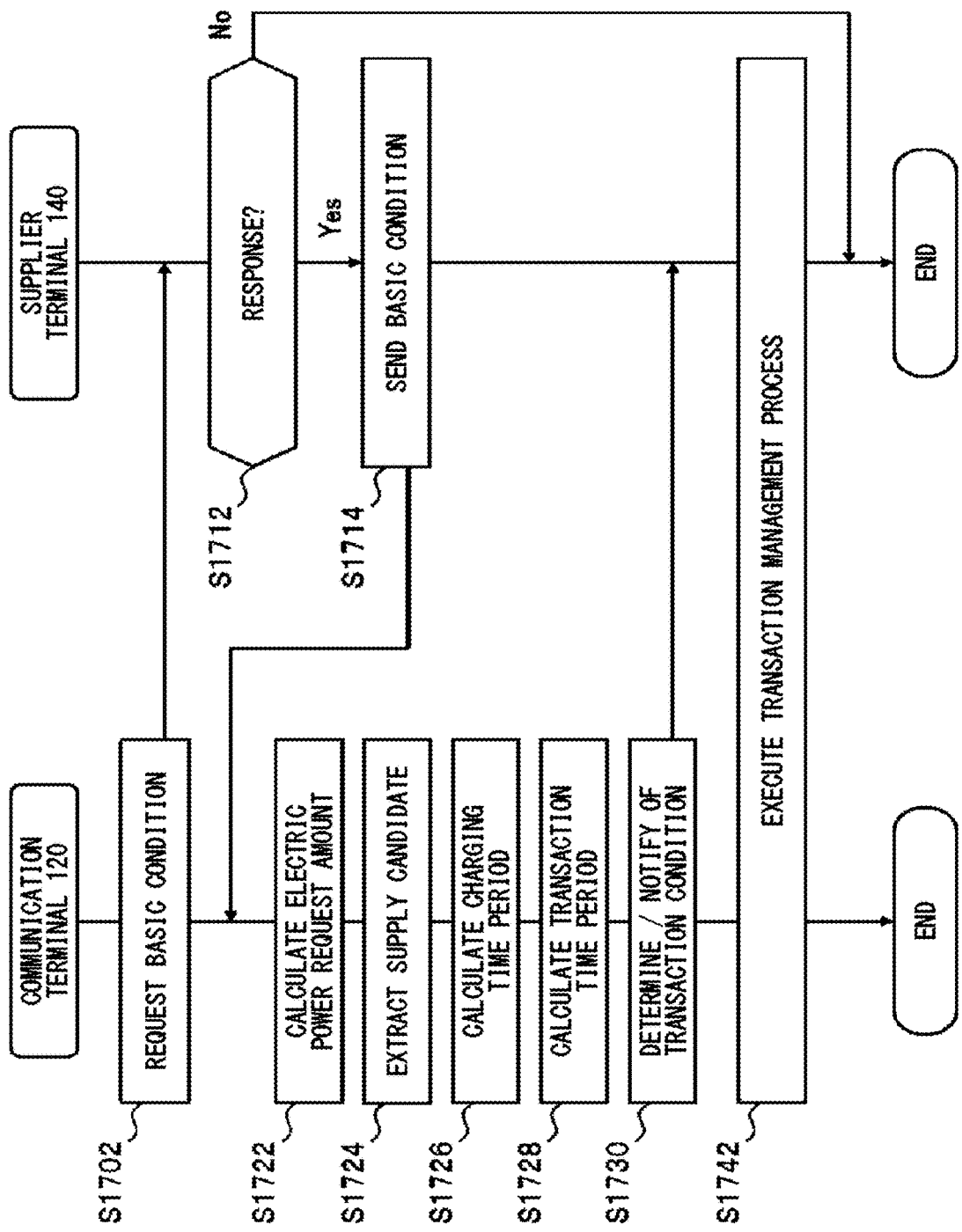
FIG. 20 schematically shows one example of information processing according to the transaction management system 1400.

FIG. 20 schematically shows one example of the information processing according to the transaction management system 1400. The present embodiment is different from the information processing described with reference to FIG. 18 and FIG. 19 in the point that the communication terminal 120 does not send the tendering condition to the communication terminal 140.

According to the present embodiment, first, in an S1702, the request generating unit 402 of the communication terminal 120 requests the communication terminal 140 for sending all information or specified information described in the basic condition 908 of the data table 900 stored in the supply-side information storing unit 524. In an S1712, the response generating unit 404 of the communication terminal 140 determines whether or not to respond to the request from the communication terminal 120. For example, the response generating unit 404 determines whether or not to respond to the request from the communication terminal 120 based on the status 912 related to the bid of the data table 900.

If a response to the request from the communication terminal 140 is not to be made (NO in the S1712), the communication terminal 140 ends the processing. On the other hand, if a response to the request from the communication terminal 120 is to be made (YES of the S1712), in an S1714, the response generating unit 404 sends the requested information to the communication terminal 120.

After that, in an S1722, S1724, S1726, S1728, and S1730, the transaction condition determining unit 550 executes the procedures similar to the S1012, S1014, S1016, S1018, and S1032 described with reference to FIG. 13. Also, in an S1724, the transaction management unit 560 of the communication terminal 120 and the transaction management unit 560 of the communication terminal 140 execute the transaction management process.

While the embodiments of the present invention have been described, the technical scope of the invention is not limited to the above described embodiments. It is apparent to persons skilled in the art that various alterations and improvements can be added to the above-described embodiments. Also, unless a technical contradiction occurs, the matters described in a particular embodiment may be applied to another embodiment. It is also apparent from the scope of the claims that the embodiments added with such alterations or improvements can be included in the technical scope of the invention.

The operations, procedures, steps, and stages of each process performed by an apparatus system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. An information processing system, comprising:
   a request amount acquiring unit to acquire information related to a request amount of a consumable for driving a device, the request amount determined based on a location of the device that uses the consumable;
   a supply speed acquiring unit to acquire a value of a supply speed per combination of a specification of a power storage apparatus of the device and a specification of a power feeding apparatus of each of one or more supply candidates which can supply the request amount of the consumable, the acquiring based on (i) information related to a suppliable amount of the consumable and (ii) the value of the supply speed; and
   a supply time period determining unit to determine a supply time period, which is a period from a time at which the supply candidate starts to provide the consumable to a time at which the request amount of the consumable is provided, based on the information related to the request amount acquired by the request amount acquiring unit and the value of the supply speed acquired by the supply speed acquiring unit with respect to each of the supply candidates which can supply the request amount of the consumable,
   wherein the device is a mobile body, and
   wherein the power feeding apparatus is:
      (i) at least one of a power generating apparatus, a power storage apparatus, and a charging apparatus mounted on a mobile body of the corresponding supply candidate, or
      (ii) at least one of a mobile power generating apparatus, a mobile power storage apparatus, and a mobile charging apparatus.

2. The information processing system according to claim 1, further comprising:

a supplier determining unit to determine a supplier or a supply apparatus of the consumable based on the supply time period determined by the supply time period determining unit.

3. The information processing system according to claim 2, further comprising:
a selection screen generating unit to generate a selection screen showing candidate identification information for identifying each supply candidate and the supply time period determined by the supply time period determining unit which are corresponded to each other with respect to each of the supply candidates which can supply the request amount of the consumable;
an output controlling unit to cause an output unit of the device or of a communication terminal of a user of the device to output the selection screen generated by the selection screen generating unit; and
a user instruction acquiring unit to acquire candidate identification information of a supply candidate selected by the user as the supplier or the supply apparatus from the device or the communication terminal of the user of the device, wherein
the supplier determining unit determines a supply candidate which is identified according to the candidate identification information acquired by the user instruction acquiring unit as the supplier or the supply apparatus.

4. The information processing system according to claim 1, further comprising:
a completion time period determining unit to determine a completion time period which is a period from a time at which a transaction is established to a time at which the request amount of the consumable is provided based on (i) a period from a time at which the transaction is established to a time at which a provision of the consumable is started and (ii) the supply time period determined by the supply time period determining unit with respect to each of the supply candidates which can supply the request amount of the consumable; and
a supplier determining unit to determine a supplier or a supply apparatus of the consumable based on the completion time period which is determined by the completion time period determining unit.

5. The information processing system according to claim 4, further comprising:
a selection screen generating unit to generate a selection screen showing candidate identification information for identifying each supply candidate and the completion time period determined by the completion time period determining unit which are corresponded to each other with respect to each of the supply candidates which can supply the request amount of the consumable;
an output controlling unit to cause an output unit of the device or of a communication terminal of a user of the device to output the selection screen generated by the selection screen generating unit; and
a user instruction acquiring unit to acquire candidate identification information of a supply candidate selected by the user as the supplier or the supply apparatus from the device or the communication terminal of the user of the device, wherein
the supplier determining unit determines a supply candidate which is identified as the supplier or the supply apparatus according to the candidate identification information acquired by the user instruction acquiring unit.

6. An information processing system, comprising:
a request amount acquiring unit to acquire information related to a request amount of a consumable for driving a device, the request amount determined based on a location of the device which uses the consumable;
a supply speed acquiring unit to acquire a value of a supply speed per combination of a specification of a power storage apparatus of the device and a specification of a power feeding apparatus of each of one or more supply candidates which can supply the request amount of the consumable, the acquiring based on (i) information related to a suppliable amount of the consumable and (ii) the value of the supply speed; and
a completion time determining unit to determine a completion time which is a time at which a provision of the request amount of the consumable is completed based on (i) a necessary preparation time period after a transaction establishment until a departure of the corresponding supply candidate, (ii) an estimated time at which the device arrives at a merging area, (iii) a necessary preparation time period after the merging and until the beginning of the charging, (iv) the information related to the request amount acquired by the request amount acquiring unit and (v) the value of the supply speed acquired by the supply speed acquiring unit with respect to each of the supply candidates which can supply the request amount of the consumable,
wherein the device is a mobile body, and
wherein the power feeding apparatus is:
(i) at least one of a power generating apparatus, a power storage apparatus, and a charging apparatus mounted on a mobile body of the corresponding supply candidate, or
(ii) at least one of a mobile power generating apparatus, a mobile power storage apparatus, and a mobile charging apparatus.

7. The information processing system according to claim 6, further comprising:
a supplier determining unit to determine a supplier or a supply apparatus of the consumable based on the completion time determined by the completion time determining unit.

8. The information processing system according to claim 7, further comprising:
a selection screen generating unit to generate a selection screen showing candidate identification information for identifying each supply candidate and the completion time determined by the completion time determining unit which are corresponded to each other with respect to each of the supply candidates which can supply the request amount of the consumable;
an output controlling unit to cause an output unit of the device or of a communication terminal of a user of the device to output the selection screen generated by the selection screen generating unit; and
a user instruction acquiring unit to acquire candidate identification information of a supply candidate selected by the user as the supplier or the supply apparatus from the device or the communication terminal of the user of the device, wherein
the supplier determining unit determines a supply candidate which is identified according to the candidate identification information acquired by the user instruction acquiring unit as the supplier or the supply apparatus.

9. The information processing system according to claim 2, further comprising:

a residual amount acquiring unit to acquire information related to a residual amount of the consumable; and a detecting unit to detect whether the residual amount acquired by the residual amount acquiring unit is smaller than a predetermined value, wherein if the detecting unit detects that the residual amount is smaller than the predetermined value, the supplier determining unit determines the supplier or the supply apparatus from supply candidates by which a period until a provision of the consumable is started is shorter than a predetermined period among the supply candidates which can supply the request amount of the consumable.

10. The information processing system according to claim 9, further comprising:

an atmospheric temperature acquiring unit to acquire information related to an atmospheric temperature in a periphery of the device, wherein the predetermined value is set based on the atmospheric temperature acquired by the atmospheric temperature acquiring unit.

11. The information processing system according to claim 2, wherein the supplier determining unit contacts a rescue supplier about location information showing a location of the device to demand a help when the supplier determining unit cannot determine the supplier or the supply apparatus of the consumable.

12. The information processing system according to claim 1, further comprising:

a request amount determining unit to determine the request amount based on the location of the device.

13. The information processing system according to claim 12, further comprising:

a device location acquiring unit to acquire device location information related to a location of the device in a specified time period; and a residual amount acquiring unit to acquire information related to a residual amount of the consumable in the specified time period, wherein the request amount determining unit determines the request amount based on the device location information acquired by the device location acquiring unit and the information related to the residual amount acquired by the residual amount acquiring unit.

14. The information processing system according to claim 1, wherein the device is an electric automobile, and the consumable is electric power.

15. The information processing system according to claim 1, further comprising:

a map screen generation unit to generate, based on supply location information related to a location of each of the one or more supply candidates, a map screen on which one or more icons showing a location of each of at least part of the supply candidates are displayed on a map.

16. The information processing system according to claim 15, wherein the map screen generation unit determines at least one of a shape, a pattern, a color, and a size of the one or more icons based on the value of the supply speed of the at least part of the supply candidates, the at least part of the supply candidates respectively corresponding to the one or more icons.

17. The information processing system according to claim 15, wherein the supply speed acquiring unit acquires the value of the supply speed of a supply candidate which satisfies a specified condition among supply candidates existing inside a geographic range displayed on the map screen, and wherein the specified condition is any one of:

a condition that the value of the supply speed of the supply candidate is larger than a predetermined value;

a condition that the supply candidate is positioned higher than a predetermined ranking, in a case where the supply candidates are arranged in a descending order of the value of the supply speeds of each of the supply candidates, or a condition that a type of a supply apparatus of the supply candidate satisfies a predetermined condition.

18. The information processing system according to claim 1, wherein the supply speed acquiring unit acquires the value of the supply speed of each of one or more supply candidates, which can supply the request amount of the consumable and of which a location satisfies a specified condition, based on (i) information related to a suppliable amount of the consumable, (ii) the value of the supply speed and (iii) information showing a location, of each of one or more supply candidates which can supply the consumable, and wherein the specified condition is any one of:

a condition that a distance between (a) a location of the supply candidate and (b) (i) a current location of the device or (ii) a merging area of the device and the supply candidate is smaller than a predetermined value;

a condition that a location of the supply candidate is a location where the supply candidate can merge with the device before a predetermined time; or a condition that a location of the supply candidate is a location where the supply candidate can merge with the device within a predetermined time period.

19. The information processing system according to claim 1, wherein each of the one or more supply candidates includes at least two types from among three types of a power storage apparatus, a charging apparatus and a power generating apparatus.

20. An information processing system, comprising:

a map screen generation unit to generate, based on (i) supply location information related to a location and (ii) information related to a supply speed of a consumable and a suppliable area of the consumable of each of one or more supply candidates which can supply the consumable, a map screen on which (a) one or more icons showing a location of each of at least part of the supply candidates and (b) information showing the suppliable area and a suppliable amount of the consumable for each of the at least part of the supply candidates are displayed on a map; and a supply-side information acquiring unit to acquire information related to the supply speed and the suppliable area of the at least part of the supply candidates, wherein the map screen generation unit determines at least one of a shape, a pattern, a color, and a size of the one or more icons based on information related to the supply speed of the at least part of the supply candidates, the at least part of the supply candidates respectively corresponding to the one or more icons, and the suppliable area of the consumable is a geographic range within which the corresponding supply candidate is available to merge, and wherein each of the one or more supply candidates includes:
  (i) at least one of a power generating apparatus, a power storage apparatus, and a charging apparatus mounted on a mobile body, or
  (ii) at least one of a mobile power generating apparatus, a mobile power storage apparatus, and a mobile charging apparatus.

21. A non-transitory computer readable medium storing thereon a program causing a computer to serve as an information processing system by performing operations comprising:

acquiring request amount where the computer acquires information related to a request amount of a consumable for driving a device, the request amount determined based on a location of the device which uses the consumable;

acquiring supply speed where the computer acquires a value of a supply speed per combination of a specification of a power storage apparatus of the device and a specification of a power feeding apparatus of each of one or more supply candidates which can supply the request amount of the consumable, the acquiring based on (i) information related to a suppliable amount of the consumable and (ii) the value of the supply speed; and determining supply time period where the computer determines a supply time period, which is a period from a time at which the supply candidate starts to provide the consumable to a time at which the request amount of the consumable is provided, based on the request amount acquired by the request amount acquiring and the value of the supply speed acquired by the supply speed acquiring with respect to each of the supply candidates which can supply the request amount of the consumable, wherein the device is a mobile body, and wherein the power feeding apparatus is:
  (i) at least one of a power generating apparatus, a power storage apparatus, and a charging apparatus mounted on a mobile body of the corresponding supply candidate, or
  (ii) at least one of a mobile power generating apparatus, a mobile power storage apparatus, and a mobile charging apparatus.

22. A non-transitory computer readable medium storing thereon a program causing a computer to serve as an information processing system by performing operations comprising:

acquiring request amount where the computer acquires information related to a request amount of a consumable for driving a device, the request amount determined based on a location of the device which uses the consumable;

acquiring supply speed where the computer acquires a value of a supply speed per combination of a specification of a power storage apparatus of the device and a specification of a power feeding apparatus of each of one or more supply candidates which can supply the request amount of the consumable, the acquiring based on (i) information related to a suppliable amount of the consumable and (ii) the value of the supply speed; and determining completion time where the computer determines a completion time which is a time at which a provision of the request amount of the consumable is completed based on (i) a necessary preparation time period after a transaction establishment until a departure of the corresponding supply candidate, (ii) an estimated time at which the device arrives at a merging area, (iii) a necessary preparation time period after the merging and until the beginning of the charging, (iv) the request amount acquired by the request amount acquiring and (v) the value of the supply speed acquired by the supply speed acquiring with respect to each of the supply candidates which can supply the request amount of the consumable, wherein the device is a mobile body, and wherein the power feeding apparatus is:
  (i) at least one of a power generating apparatus, a power storage apparatus, and a charging apparatus mounted on a mobile body of the corresponding supply candidate, or
  (ii) at least one of a mobile power generating apparatus, a mobile power storage apparatus, and a mobile charging apparatus.

23. A non-transitory computer readable medium storing thereon a program causing a computer to serve as an information processing system by performing operations comprising:

generating map screen where the computer generates, based on (i) supply location information related to a location and (ii) information related to a supply speed of a consumable and a suppliable area of the consumable of each of one or more supply candidates who can supply the consumable, a map screen on which (a) one or more icons showing a location of each of at least part of the supply candidates and (b) information showing the suppliable area and a suppliable amount of the consumable for each of the at least part of the supply candidates are displayed on a map; and acquiring supply speed where the computer acquires information related to the supply speed and the suppliable area of the at least part of the supply candidates, wherein generating the map screen includes:
  determining, by the computer, at least one of a shape, a pattern, a color, and a size of the one or more icons based on information related to the supply speed of the at least part of the supply candidates, the at least part of the supply candidates corresponding to the one or more icons, and the suppliable area of the consumable is a geographic range within which the corresponding supply candidate is available to merge, and wherein each of the one or more supply candidates includes:
  (i) at least one of a power generating apparatus, a power storage apparatus, and a charging apparatus mounted on a mobile body, or
  (ii) at least one of a mobile power generating apparatus, a mobile power storage apparatus, and a mobile charging apparatus.

24. An information processing method, comprising:

request amount acquiring where a computer acquires information related to a request amount of a consumable for driving a device, the request amount determined based on a location of the device which uses the consumable;

supply speed acquiring where the computer acquires a value of a supply speed per combination of a specification of a power storage apparatus of the device and a specification of a power feeding apparatus of each of one or more supply candidates which can supply the request amount of the consumable, the acquiring based on (i) information related to a suppliable amount of the consumable and (ii) the value of the supply speed; and supply time period determining where the computer determines a supply time period, which is a period from a time at which the supply candidate starts to provide the consumable to a time at which the request amount of the consumable is provided, based on the request amount acquired by the request amount acquiring and the value of the supply speed acquired by the supply speed acquiring with respect to each of the supply candidates which can supply the request amount of the consumable, wherein the device is a mobile body, and wherein the power feeding apparatus is:
(i) at least one of a power generating apparatus, a power storage apparatus, and a charging apparatus mounted on a mobile body of the corresponding supply candidate, or
(ii) at least one of a mobile power generating apparatus, a mobile power storage apparatus, and a mobile charging apparatus.

25. The information processing method according to claim 24, further comprising:

supplier determining where the computer determines a supplier or a supply apparatus of the consumable based on the supply time period determined during the supply time period determining; and contacting, by the computer, a rescue supplier about location information showing a location of the device to demand a help when the computer cannot determine the supplier or the supply apparatus of the consumable during the supplier determining.

26. An information processing method, comprising:

request amount acquiring where a computer acquires information related to a request amount of a consumable for driving a device, the request amount determined based on a location of the device which uses the consumable;

supply speed acquiring where the computer acquires a value of a supply speed per combination of a specification of a power storage apparatus of the device and a specification of a power feeding apparatus of each of one or more supply candidates which can supply the request amount of the consumable, the acquiring based on (i) information related to a suppliable amount of the consumable and (ii) the value of the supply speed; and completion time determining where the computer determines a completion time which is a time at which a provision of the request amount of the consumable is completed based on (i) a necessary preparation time period after a transaction establishment until a departure of the corresponding supply candidate, (ii) an estimated time at which the device arrives at a merging area, (iii) a necessary preparation time period after the merging and until the beginning of the charging, (iv) the request amount acquired by the request amount acquiring and (v) the value of the supply speed acquired by the supply speed acquiring with respect to each of the supply candidates which can supply the request amount of the consumable, wherein the device is a mobile body, and wherein the power feeding apparatus is:
(i) at least one of a power generating apparatus, a power storage apparatus, and a charging apparatus mounted on a mobile body of the corresponding supply candidate, or
(ii) at least one of a mobile power generating apparatus, a mobile power storage apparatus, and a mobile charging apparatus.

27. The information processing method according to claim 26, further comprising:

supplier determining where the computer determines a supplier or a supply apparatus of the consumable based on the completion time determined during the completion time determining; and contacting, by the computer, a rescue supplier about location information showing a location of the device to demand a help when the computer cannot determine the supplier or the supply apparatus of the consumable during the supplier determining.

28. The information processing method according to claim 24, further comprising:

map screen generating where the computer generates, based on supply location information related to a location of each of the one or more supply candidates, a map screen on which one or more icons showing a location of each of at least part of the supply candidates are displayed on a map, wherein the supply speed acquiring includes:
acquiring, by the computer, the value of the supply speed of a supply candidate which satisfies a specified condition among supply candidates existing inside a geographic range displayed on the map screen, and wherein the specified condition is any one of:
a condition that the value of the supply speed of the supply candidate is larger than a predetermined value;
a condition that the supply candidate is positioned higher than a predetermined ranking, in a case where the supply candidates are arranged in a descending order of the value of the supply speeds of each of the supply candidates, or
a condition that a type of a supply apparatus of the supply candidate satisfies a predetermined condition.

29. The information processing method according to claim 24, wherein the supply speed acquiring includes:
acquiring, by the computer, the value of the supply speed of each of one or more supply candidates, which can supply the request amount of the consumable and of which a location satisfies a specified condition, based on (i) information related to a suppliable amount of the consumable, (ii) the value of the supply speed of the consumable and (iii) information showing a location, of each of one or more supply candidates which can supply the consumable, and wherein the specified condition is any one of:
a condition that a distance between (a) a location of the supply candidate and (b) (i) a current location of the device or (ii) a merging area where the device will merge with the supply candidate is smaller than a predetermined value;
a condition that a location of the supply candidate is a location where the supply candidate can merge with the device before a predetermined time; or a condition that a location of the supply candidate is a location where the supply candidate can merge with the device within a predetermined time period.

30. The information processing method according to claim 24, wherein each of the one or more supply candidates includes at least two types from among three types of a power storage apparatus, a charging apparatus and a power generating apparatus.

31. An information processing method, comprising:

map screen generating where a computer generates, based on (i) supply location information related to a location and (ii) information related to a supply speed of a consumable and a suppliable area of the consumable of each of one or more supply candidates who can supply the consumable, a map screen on which (a) one or more icons showing a location of each of at least part of the supply candidates and (b) information showing the suppliable area and a suppliable amount of the consumable for each of the at least part of the supply candidates are displayed on a map; and supply speed acquiring where the computer acquires information related to the supply speed and the suppliable area of the at least part of the supply candidates, wherein the map screen generating includes:
  determining, by the computer, at least one of a shape, a pattern, a color, and a size of the one or more icons based on information related to the supply speed of the at least part of the supply candidates, the at least part of the supply candidates corresponding to the one or more icons, and the suppliable area of the consumable is a geographic range within which the corresponding supply candidate is available to merge, and wherein each of the one or more supply candidates includes:
  (i) at least one of a power generating apparatus, a power storage apparatus, and a charging apparatus mounted on a mobile body, or
  (ii) at least one of a mobile power generating apparatus, a mobile power storage apparatus, and a mobile charging apparatus.

* * * * *